US012726838B2

(12) United States Patent
Zhang et al.

(10) Patent No.: US 12,726,838 B2
(45) Date of Patent: Sep. 1, 2026

(54) TECHNIQUES FOR UPDATING CROSS LINK INTERFERENCE RESOURCES BASED ON A DYNAMIC SUBBAND FULL DUPLEX UPDATE

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/448,795

(22) Filed: Aug. 11, 2023

(65) Prior Publication Data

US 2025/0056268 A1 Feb. 13, 2025

(51) Int. Cl.
*H04W 24/08* (2009.01)
*H04B 17/345* (2015.01)
*H04L 5/14* (2006.01)

(52) U.S. Cl.
CPC .......... *H04W 24/08* (2013.01); *H04B 17/345* (2015.01); *H04L 5/14* (2013.01)

(58) Field of Classification Search
None
See application file for complete search history.

(56) References Cited

U.S. PATENT DOCUMENTS

2024/0214852 A1* 6/2024 Kiran .................... H04W 24/10
2026/0032686 A1* 1/2026 Lu ......................... H04L 1/1664
2026/0074876 A1* 3/2026 Park .......................... H04L 5/14

FOREIGN PATENT DOCUMENTS

WO WO-2024017298 A1 * 1/2024 ........ H04W 72/0446

OTHER PUBLICATIONS

Qualcomm, "Feasibility and techniques for Subband non-overlapping full duplex", Nov. 2022, 3GPP. (Year: 2022).*
Qualcomm, "Feasibility and techniques for Subband non-overlapping full duplex", Apr. 2023, 3GPP. (Year: 2023).*
Qualcomm, "Feasibility and techniques for Subband non-overlapping full duplex", May 2023, 3GPP. (Year: 2023).*
(Continued)

*Primary Examiner* — Peter P Chau
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicative of a semi-static time and frequency subband full-duplex (SBFD) configuration associated with at least one resource semi-statically configured as an SBFD resource, wherein the at least one resource comprises a time and frequency resource. The UE may receive a dynamic SBFD update indication associated with the at least one resource. The UE may perform a cross link interference (CLI) measurement task associated with an updated CLI resource based on the dynamic SBFD update indication. Numerous other aspects are described.

30 Claims, 20 Drawing Sheets

(56) References Cited

OTHER PUBLICATIONS

Gaal P (Qualcomm Incorporated)., et al., “Feasibility and Techniques for Subband Non-Overlapping Full Duplex”, 3GPP TSG RAN WG1, Meeting #111, R1-2301411, 3rd Generation Partnership Project, Mobile Competence Centre, 650, Route Des Lucioles, F-06921 Sophia-Antipolis Cedex, France, vol. 3GPP RAN 1, No. Athens, GR, Nov. 14, 2023-Nov. 18, 2023, Feb. 17, 2023, 57 Pages, XP052248543, p. 9.

International Search Report and Written Opinion—PCT/US2024/032958—ISA/EPO—Sep. 6, 2024.

* cited by examiner 400
404-2
404-1
DL
UL
402
UE1

410
404-2
404-1
DL
UL
402-1
UE1
402-2
UE2

420
404
DL
UL
402
UE1
Self-interference from DL to UL
Self-interference from UL to DL 430
Network Node 110
404-2
404-1
DL
UL
402-1
UE1
402-2
UE2

718

728

726

724

730
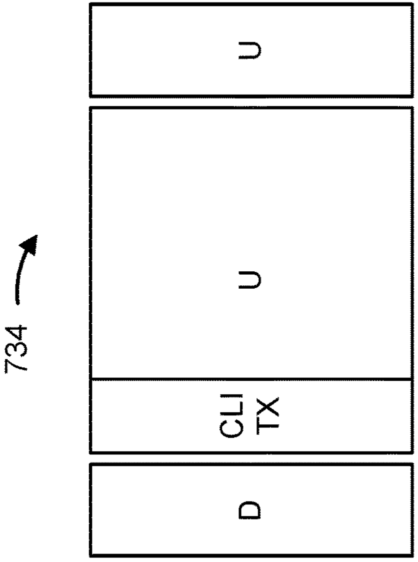
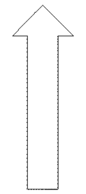
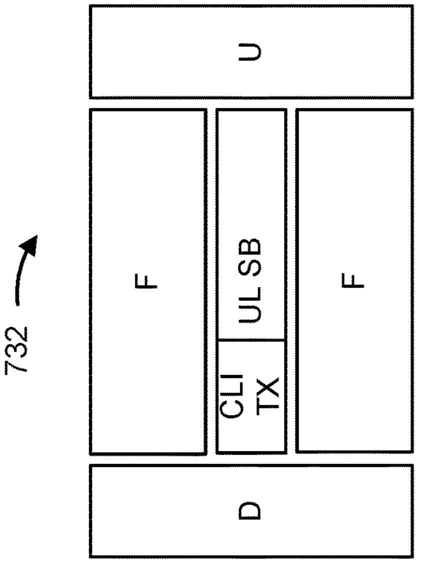

736

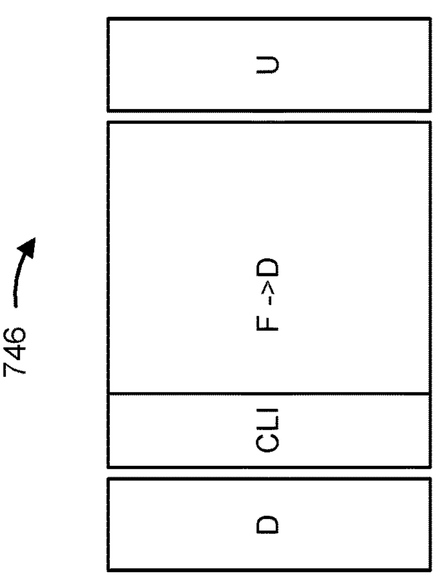
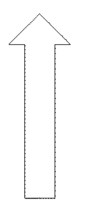
FIG. 7F
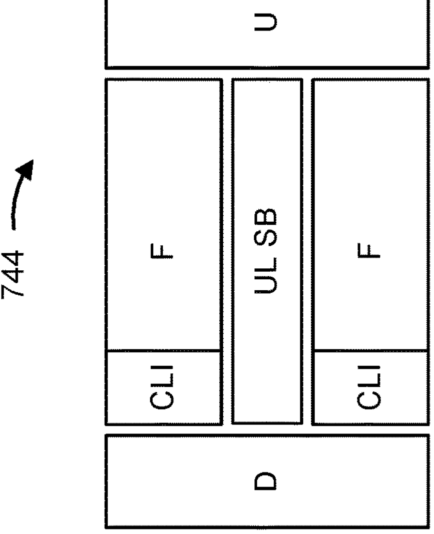
742

752

750

748

754

760

TECHNIQUES FOR UPDATING CROSS LINK INTERFERENCE RESOURCES BASED ON A DYNAMIC SUBBAND FULL DUPLEX UPDATE

FIELD OF THE DISCLOSURE

Aspects of the present disclosure generally relate to wireless communication and to techniques and apparatuses for updating cross link interference resources based on a dynamic subband full duplex update.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a user equipment (UE) for wireless communication. The user equipment may include one or more memories and one or more processors coupled to the one or more memories. The one or more processors may be configured to receive configuration information indicative of a semi-static time and frequency subband full-duplex (SBFD) configuration associated with at least one resource semi-statically configured as an SBFD resource, wherein the at least one resource comprises a time and frequency resource. The one or more processors may be configured to receive a dynamic SBFD update indication associated with the at least one resource. The one or more processors may be configured to perform a cross link interference (CLI) measurement task associated with an updated CLI resource based on the dynamic SBFD update indication.

Some aspects described herein relate to a network node for wireless communication. The network node may include one or more memories and one or more processors coupled to the one or more memories. The one or more processors may be configured to transmit configuration information indicative of a semi-static time and frequency SBFD configuration associated with at least one resource semi-statically configured as an SBFD resource, wherein the at least one resource comprises a time and frequency resource. The one or more processors may be configured to transmit a dynamic SBFD update indication associated with the at least one resource. The one or more processors may be configured to perform a CLI measurement task associated with an updated CLI resource based on the dynamic SBFD update indication.

Some aspects described herein relate to a method of wireless communication performed by a UE. The method may include receiving configuration information indicative of a semi-static time and frequency SBFD configuration associated with at least one resource semi-statically configured as an SBFD resource, wherein the at least one resource comprises a time and frequency resource, receiving a dynamic SBFD update indication associated with the at least one resource. The method may include performing a CLI measurement task associated with an updated CLI resource based on the dynamic SBFD update indication.

Some aspects described herein relate to a method of wireless communication performed by a network node. The method may include transmitting configuration information indicative of a semi-static time and frequency SBFD configuration associated with at least one resource semi-statically configured as an SBFD resource, wherein the at least one resource comprises a time and frequency resource. The method may include transmitting a dynamic SBFD update indication associated with the at least one resource. The method may include performing a CLI measurement task associated with an updated CLI resource based on the dynamic SBFD update indication.

Some aspects described herein relate to a non-transitory computer-readable medium that stores a set of instructions for wireless communication by a UE. The set of instructions, when executed by one or more processors of the UE, may cause the UE to receive configuration information indicative of a semi-static time and frequency SBFD configuration associated with at least one resource semi-statically configured as an SBFD resource, wherein the at least one resource comprises a time and frequency resource. The set of instructions, when executed by one or more processors of the UE, may cause the UE to receive a dynamic SBFD update indication associated with the at least one resource. The set of instructions, when executed by one or more processors of the UE, may cause the UE to perform a CLI measurement task associated with an updated CLI resource based on the dynamic SBFD update indication.

Some aspects described herein relate to a non-transitory computer-readable medium that stores a set of instructions for wireless communication by a network node. The set of instructions, when executed by one or more processors of the network node, may cause the network node to transmit configuration information indicative of a semi-static time and frequency SBFD configuration associated with at least one resource semi-statically configured as an SBFD resource, wherein the at least one resource comprises a time and frequency resource. The set of instructions, when executed by one or more processors of the network node, may cause the network node to transmit a dynamic SBFD update indication associated with the at least one resource. The set of instructions, when executed by one or more processors of the network node, may cause the network node to perform a CLI measurement task associated with an updated CLI resource based on the dynamic SBFD update indication.

Some aspects described herein relate to an apparatus for wireless communication. The apparatus may include means for receiving configuration information indicative of a semi-static time and frequency SBFD configuration associated with at least one resource semi-statically configured as an SBFD resource, wherein the at least one resource comprises a time and frequency resource. The apparatus may include means for receiving a dynamic SBFD update indication associated with the at least one resource. The apparatus may include means for performing a CLI measurement task associated with an updated CLI resource based on the dynamic SBFD update indication.

Some aspects described herein relate to an apparatus for wireless communication. The apparatus may include means for transmitting configuration information indicative of a semi-static time and frequency SBFD configuration associated with at least one resource semi-statically configured as an SBFD resource, wherein the at least one resource comprises a time and frequency resource. The apparatus may include means for transmitting a dynamic SBFD update indication associated with the at least one resource. The apparatus may include means for performing a CLI measurement task associated with an updated CLI resource based on the dynamic SBFD update indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7J are diagrams illustrating examples associated with updating cross link interference (CLI) resources based on a dynamic SBFD update, in accordance with the present disclosure.

DETAILED DESCRIPTION

Figure 1:
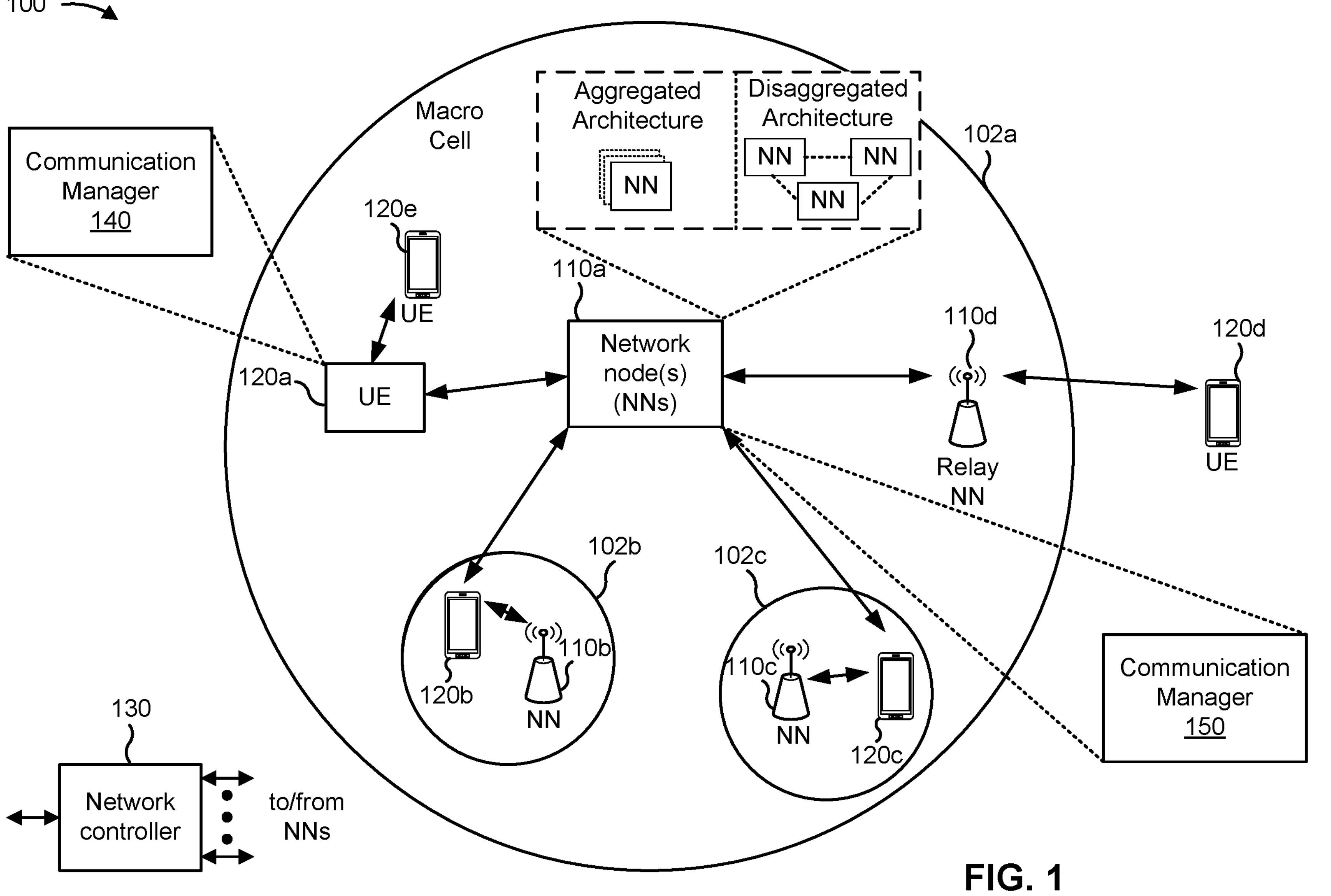
FIG. 1 is a diagram illustrating an example of a wireless network.

Various aspects relate generally to subband full duplex (SBFD) operations at a network node. Some aspects more specifically relate to determining a directionality of flexible time resources (e.g., symbols and/or slots) associated with an SBFD configuration. For example, in some aspects, a user equipment (UE) may receive configuration information indicative of the SBFD configuration and may apply a directionality rule to at least one flexible time resource to establish at least one directional format of the at least one flexible time resource. In some aspects, the directionality rule may be associated with a UE behavior with respect to receiving a slot format communication indicating a slot format update instructing the UE to update a directionality associated with at least one flexible time resource semi-statically configured as an SBFD time resource. In some aspects, the UE may receive the slot format communication and may establish a directional format of at least one flexible time resource based on a directionality indicated by the slot format communication and, in some aspects, based further on the SBFD configuration and/or an indication of scheduled time and frequency resources. For example, the UE may establish a directional format of a flexible time resource as being uplink or downlink in an uplink subband or a downlink subband, respectively. In some aspects, the UE may establish the directional format of a flexible time resource across an entire configured band (e.g., a full-band direction). In some other aspects, the UE may receive the slot format communication but may drop the slot format communication and may establish the directional format based on the SBFD configuration and/or an indication of scheduled time and frequency resources. In some other aspects, the UE may not receive the slot format communication (e.g., as transmission thereof may be prohibited) and may establish the directional format based on the SBFD configuration and/or an indication of scheduled time and frequency resources.

In some cases, for an SBFD aware UE semi-statically configured with an uplink subband in an SBFD symbol which is configured as downlink or flexible in a TDD-UL-DL-ConfigCommon slot format, if dynamic SBFD is implemented, the dynamic SBFD can fallback/remove the SBFD symbol to a legacy symbol or add more SBFD symbols on legacy D or F symbols dynamically. Dynamic SBFD can increase the scheduling flexibility based on traffic need and resource utilization and based on full duplex (FD) capability. However, dynamic SBFD operation can create additional inter-UE cross link interference (CLI) to the downlink UE. For example, if an SBFD symbol falls back to a legacy downlink (D) symbol for downlink traffic only, a downlink UE can receive in-band inter-UE CLI in UL subband resource blocks (RBs) from a neighbor UE transmitting in an uplink subband.

Some aspects of the techniques described herein may include supporting dynamic CLI measurements triggered by dynamic SBFD signaling and/or operation. For example, in some aspects, a UE may receive configuration information indicative of an SBFD configuration associated with at least one time resource semi-statically configured as an SBFD time resource. The UE may receive an indication of a CLI resource. The UE may receive a dynamic SBFD update indication associated with the at least one time resource and may perform a CLI measurement task associated with an updated CLI resource based on the dynamic SBFD update indication. In this way, a UE may autonomously update a CLI resource to facilitate measuring CLI due to dynamic SBFD updates, thereby enabling support of CLI mitigation in dynamic SBFD operations and, thus, positively impacting network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a UE (e.g., the UE 120) may include a communication manager 140. As described in more detail elsewhere herein, the communication manager 140 may receive configuration information indicative of a semi-static time and frequency SBFD configuration associated with at least one resource semi-statically configured as an SBFD resource, wherein the at least one resource comprises a time and frequency resource; receive a dynamic SBFD update indication associated with the at least one resource; and perform a CLI measurement task associated with an updated CLI resource based on the dynamic SBFD update indication. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit configuration information indicative of a semi-static time and frequency SBFD configuration associated with at least one resource semi-statically configured as an SBFD resource, wherein the at least one resource comprises a time and frequency resource; transmit a dynamic SBFD update indication associated with the at least one resource; and perform a CLI measurement task associated with an updated CLI resource based on the dynamic SBFD update indication. Additionally, or alternatively, the communication manager 150 may perform one or more other operations described herein.

As indicated above, FIG. 1 is provided as an example. Other examples may differ from what is described with regard to FIG. 1.

Figure 2:
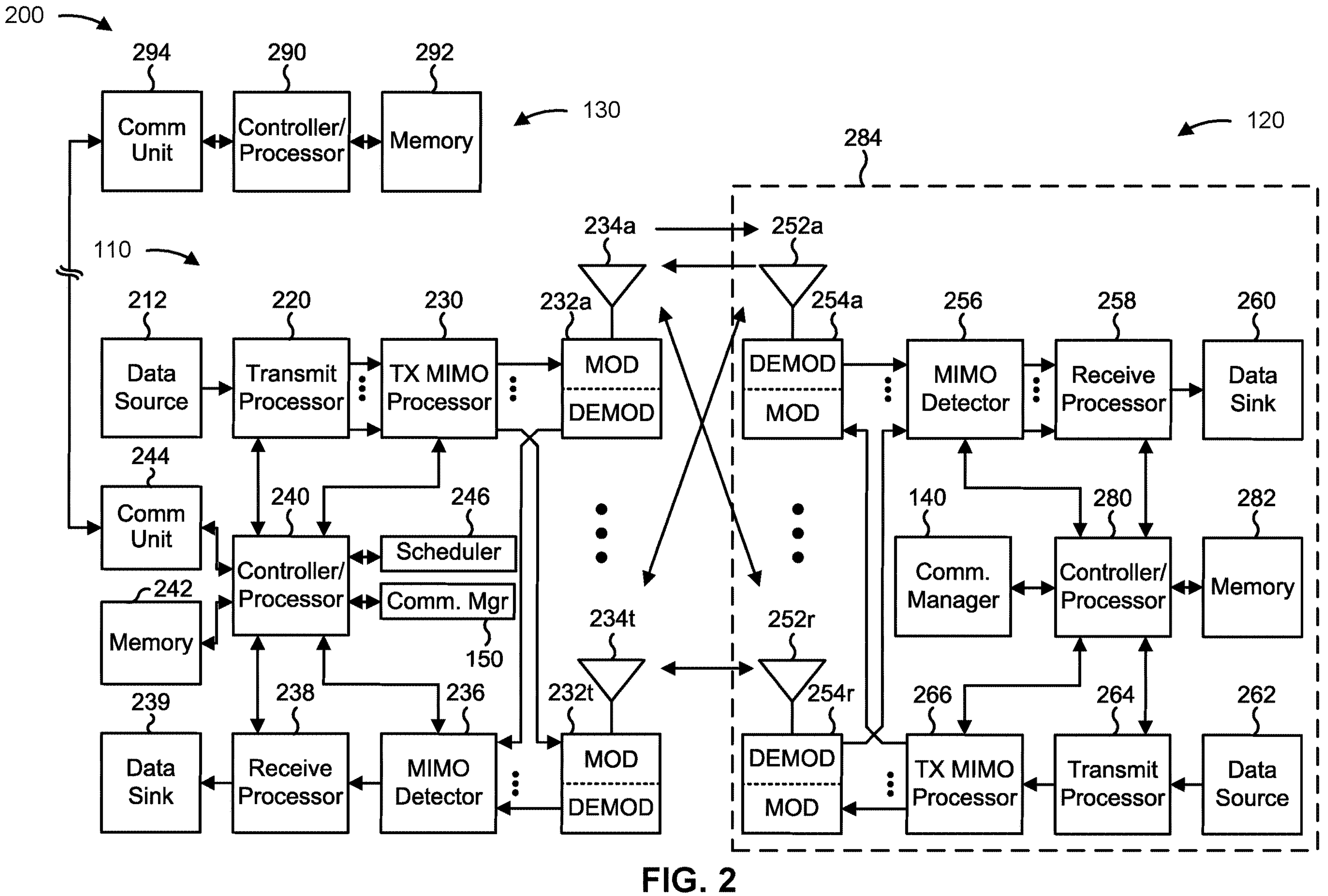
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an acknowledgement (ACK) for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 7A-11).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 7A-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or sub-components of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with updating CLI resources based on a dynamic SBFD update, as described in more detail elsewhere herein. For example, the controller/processor 240 of the network node 110, the controller/processor 280 of the UE 120, or any other component(s) (or combinations of components) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving configuration information indicative of a semi-static time and frequency SBFD configuration associated with at least one resource semi-statically configured as an SBFD resource, wherein the at least one resource comprises a time and frequency resource; means for receiving a dynamic SBFD update indication associated with the at least one resource; and/or means for performing a CLI measurement task associated with an updated CLI resource based on the dynamic SBFD update indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting configuration information indicative of a semi-static time and frequency SBFD configuration associated with at least one resource semi-statically configured as an SBFD resource, wherein the at least one resource comprises a time and frequency resource; means for transmitting a dynamic SBFD update indication associated with the at least one resource; and/or means for performing a CLI measurement task associated with an updated CLI resource based on the dynamic SBFD update indication. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU. DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
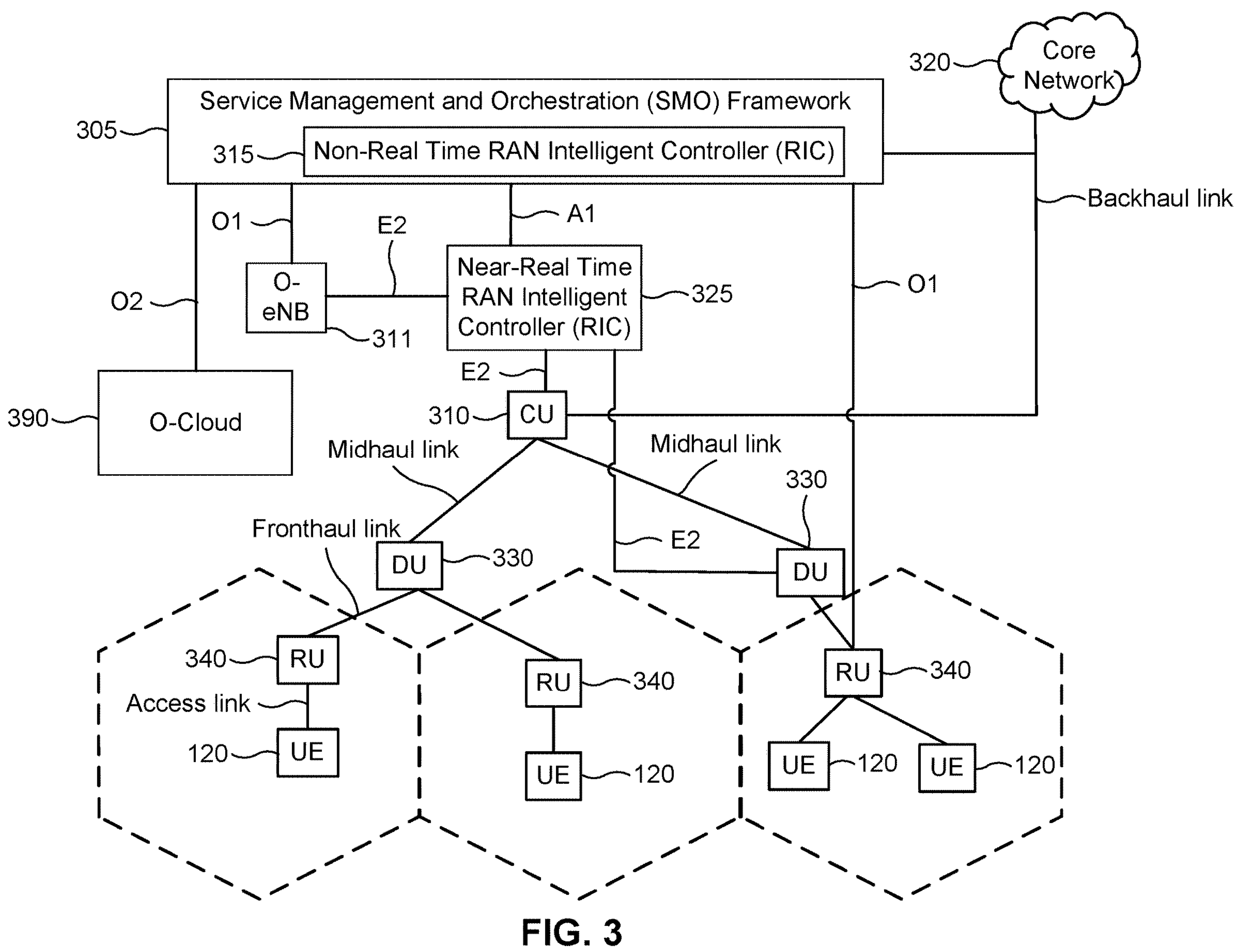
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, May include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples.

In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A-4D are diagrams illustrating examples 400, 410, 420, 430 of FD communication in accordance with the present disclosure. An FD communication is a communication that utilizes overlapped time resources at a single node (such as a UE or a base station) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different TCI states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a QCL type. A QCL type may indicate one or more spatial parameters to be derived from the source signal. The source signal may be referred to as a QCL source. FD communications can include dynamic traffic (such as scheduled by DCI) and/or semi-static traffic. Semi-static traffic is traffic associated with a semi-persistent resource, such as a semi-persistent scheduling (SPS) configured resource or a configured grant (CG).

Figures 4A, 4B, 4C, 4D:
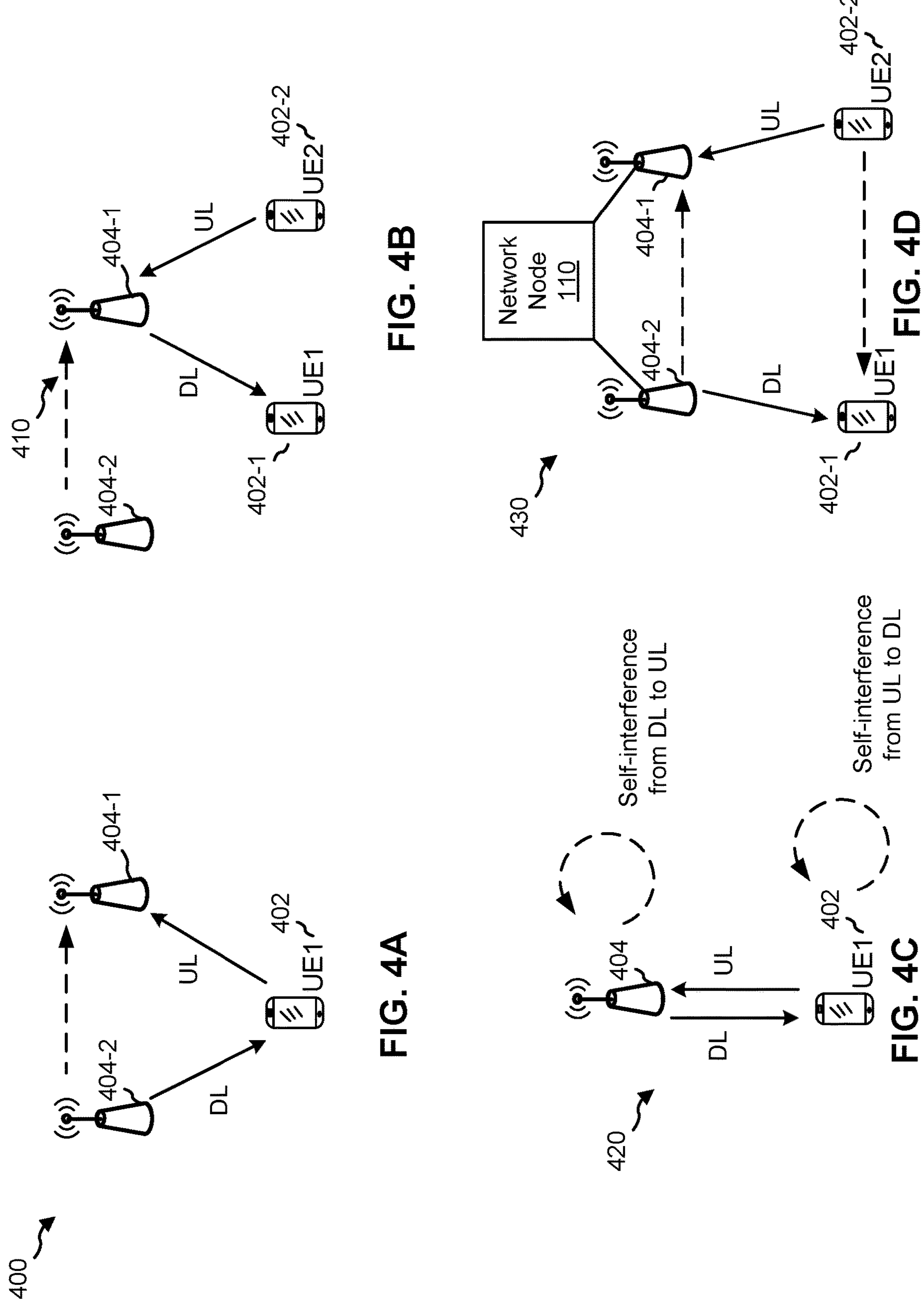
FIGS. 4A-4D are diagrams illustrating examples of full duplex (FD) communication in accordance with the present disclosure.

The example 400 of FIG. 4A includes a UE1 402 and two network nodes (e.g., TRPs) 404-1, 404-2, wherein the UE1 402 is sending uplink transmissions to the network node 404-1 and is receiving downlink transmissions from the network node 404-2. In some aspects, the network node 404 described in connection with FIG. 4 may be a base station, a TRP associated with (e.g., managed by) a network node, an RU, a DU, or a similar network node. In some aspects, the UEs 402 described in connection with FIG. 4 may be the UE 120 described in connection with FIGS. 1, 2, and 3, or a similar UE. In the example 400 of FIG. 4A, FD is enabled for the UE1 402, but not for the network nodes 404-1, 404-2. Thus, the network nodes 404-1 and 404-2 are half duplex (HD) network nodes.

The example 410 of FIG. 4B includes two UEs, UE1 402-1 and UE2 402-2, a network node 404-1, and a network node 404-2. The UE1 402-1 is receiving a downlink transmission from the network node 404-1 and the UE2 402-2 is transmitting an uplink transmission to the network node 404-1. In the example 410 of FIG. 4B, FD is enabled for the network node 404-1, but not for the UE1 402-1 and UE2 402-2. Thus, the UE1 402-1 and UE2 402-2 are half duplex UEs.

The example 420 of FIG. 4C includes a UE1 402 and a network node 404, wherein the UE1 402 is receiving a downlink transmission from the network node 404 and the UE1 402 is transmitting an uplink transmission to the network node 404. In the example 420 of FIG. 4C, FD is enabled for both the UE1 402 and the network node 404. In the example 420 of FIG. 4C, the UE1 402 and the network node 404 communicate using a beam pair. A beam pair may include a downlink beam and an uplink beam. For example, a UE1 402 may use a beam pair that includes a downlink beam (that is, a receive beam) at the UE1 402 and an uplink beam (that is, a transmit beam) at the UE1 402 to communicate with the network node 404. The network node 404 may use a downlink beam (that is, a transmit beam) at the network node 404 to transmit communications received via the UE1 402's downlink beam, and may use an uplink beam (that is, a receive beam) at the network node 404 to receive communications transmitted via the UE1 402's uplink beam.

The example 430 of FIG. 4C includes a network node 110 and two network nodes 404-1 and 404-2 associated with a cell (such as, e.g., a cell 102 described in connection with FIG. 1). The network nodes 404-1 and 404-2 may be either co-located (e.g., located at the same device, such as at the network node 110 or other device), or may be non-co-located (e.g., located apart from one another and/or from the network node 110, and thus may be standalone devices).

In FIGS. 4A-4D, examples of interference are indicated by dashed lines. Interference can occur between network nodes of examples 400, 410, 420, 430 (referred to as CLI). In FIG. 4A, network node 404-2's downlink transmission interferes with network node 404-1's uplink transmission. In FIG. 4B, network node 404-1's uplink reception may be subject to interference from a transmission by a network node 404-2. CLI between network nodes 404 is referred to herein as inter-network node CLI. In some examples in FIG. 4B, UE2 402-2's uplink transmission may interfere with UE1 402-1's downlink transmission (not shown). Similarly, in FIG. 4D, UE2 402-2's uplink transmission interferes with UE1 402-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network node 404 (from a downlink transmission to an uplink reception) are shown in FIG. 4C. It should be noted that the above-described CLI and self-interference conditions can occur in HD deployments and in FD deployments.

Some network nodes support SBFD communication, as described below. SBFD communication may involve the configuration of certain resources as having an SBFD format.

As indicated above, FIGS. 4A-4D are provided as one or more examples. Other examples may differ from what is described with regard to FIGS. 4A-4D.

Figure 5:
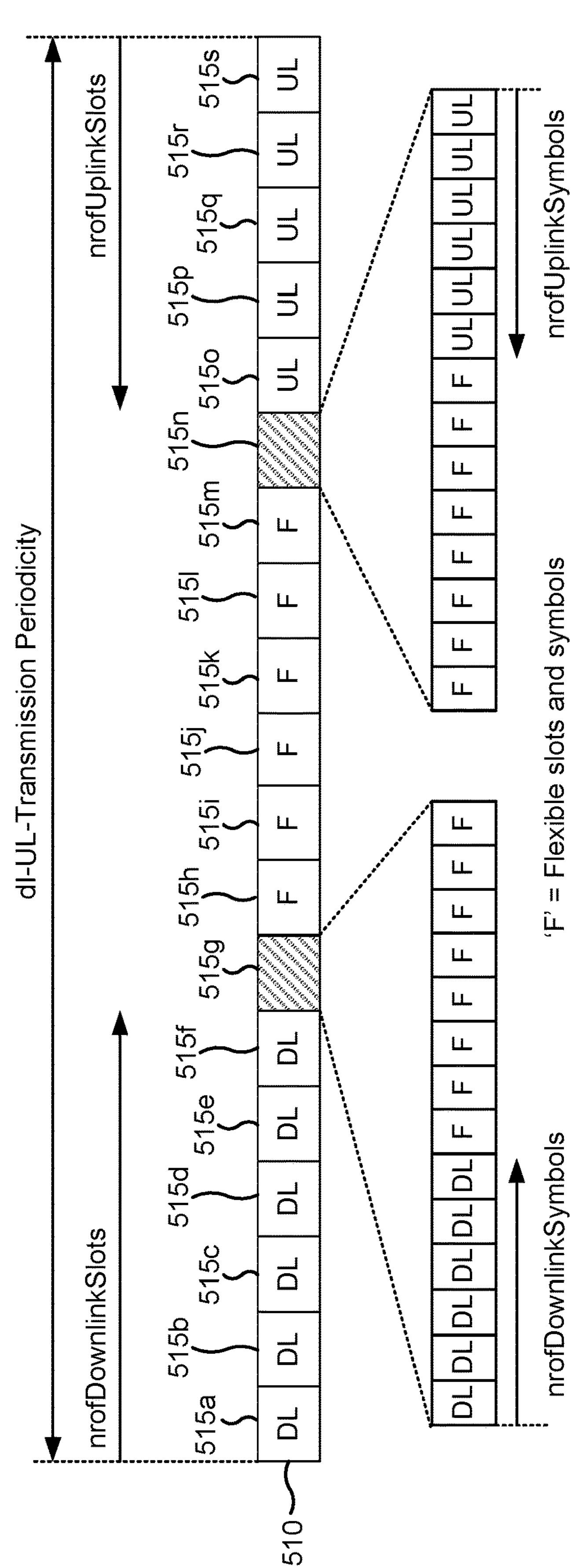
FIG. 5 is a diagram illustrating an example of a slot format used to schedule UE communications, in accordance with the present disclosure.

FIG. 5 is a diagram illustrating an example 500 of a slot format used to schedule UE communications, in accordance with the present disclosure. As described above, a transmission timeline may be organized into radio frames, subframes, slots, and symbols. However, for ease of description, only the slot and symbol granularity are depicted in FIG. 5. Example 500 shows how time division duplexed (TDD) slots (e.g., slots on a TDD carrier) can be configured as usable for uplink and/or downlink communication using a combination of semi-static and dynamic signaling.

A timeline of slots is shown by reference number 510, which includes a number of slots 515*a*-515*s*. Each slot 515 and/or portions thereof (e.g., symbols) may be scheduled and/or configured for use for an uplink ("UL") communication, a downlink ("DL") communication, or as flexible ("F"). A flexible slot (e.g., 515*h*-515*m*) may be used for either an uplink communication or a downlink communication. A resource configured and/or scheduled for use for an uplink communication is described herein as having an uplink (U) format. A resource configured and/or scheduled for use for a downlink communication is described herein as having a downlink (D) format. A resource configured and/or scheduled to include only flexible resources is described herein as having a flexible (F) format. All symbols within each slot may all be assigned alike (e.g., all "UL," all "DL," or all "F"), or else the slot may include multiple symbol assignment types. For example, in FIG. 5, slots 515*a*-515*f* (denoted by "nrofDownlinkSlots") are depicted as downlink slots without showing the symbol granularity because all symbols in each of those slots are configured as downlink symbols. Similarly, slots 515*o*-515*s* (denoted by "nrofUplinkSlots") are depicted as uplink slots without showing the symbol granularity because all symbols in each of those slots are configured as uplink symbols. In this regard, "nrofDownlinkSlots" refers to the number of consecutive full DL slots (e.g., slots including only DL symbols) at the beginning of each timeline of slots 510 (e.g., slots 515*a*-515*f*), and "nrofUplinkSlots" refers to the number of consecutive full UL slots (e.g., slots including only UL symbols) at the end of each timeline of slots 510 (e.g., slots 515*o*-515*s*).

Slots 515*g* and 515*n* include more than one format of symbols. More particularly, slot 515*g* includes six downlink symbols (denoted by "nrofDownlinkSymbols"), with the remaining eight symbols being flexible and thus available for uplink or downlink, for a total of fourteen symbols. Slot 515*n* includes six uplink symbols (denoted by "nrofUplinkSymbols"), with the remaining eight symbols being flexible and thus available for uplink or downlink, again for a total of fourteen symbols. In this regard, "nrofDownlinkSymbols" refers to the number of consecutive DL symbols in the beginning of the slot 515*g* following the last full DL slot 515*f*, and "nrofUplinkSymbols" refers to the number of consecutive UL symbols in the end of the slot 515*n* preceding the first full UL slot 515*o*. The remaining slots in the timeline of slots 510 (e.g., slots 515*h*-515*m*) are flexible (e.g., full flexible, with all symbols in these slots being configured as flexible symbols), and thus available for uplink and downlink communication.

Resources (e.g., slots and/or symbols) semi-statically configured as flexible may be later reconfigured for use for uplink or downlink communication. In some aspects, a common configuration parameter (e.g., tdd-UL-DL-ConfigurationCommon or similar) transmitted to all UEs in a cell defines a semi-static slot and/or symbol structure, including designating certain slots or symbols for use in uplink communication, downlink communication, or as flexible for use in either uplink or downlink communication. For example, the common configuration parameter may semi-statically configure slots and symbols to have an initial configuration as shown in FIG. 5. A dedicated configuration parameter (e.g., tdd-UL-DL-ConfigurationDedicated), which can be transmitted to a specific UE via a slot format indicator (SFI), may then be used to reconfigure the flexible slots and symbols as uplink or downlink slots and symbols. In some cases, for a remaining flexible slot or symbol (e.g., slots or symbols still configured as flexible after the reconfiguration due to the dedicated configuration parameter), the UE may monitor for physical downlink control channel (PDCCH) information, and determine whether a flexible slot or symbol should be configured as an uplink slot or symbol or a downlink slot or symbol based at least in part on an uplink and/or downlink resource allocation indicated by the PDCCH information. In some cases, the flexible slots or symbols may be dynamically changed by the network node via a DCI message or a similar message (which may be referred to as a UE-dedicated configuration).

Resources (e.g., slots and/or symbols) can be configured to have an SBFD format. A resource having an SBFD format includes one or more SBFD symbols. An SBFD symbol is a symbol with one or more sub-bands (referred to herein as SBFD sub-bands) that a network node (such as a gNB) can use or will use for SBFD operation. For SBFD operation within a TDD carrier, an SBFD sub-band may include 1 resource block, or a set of consecutive resource blocks, for a same transmission direction. In some aspects, for SBFD operation within a TDD carrier, an SBFD sub-band consists of 1 resource block, or a set of consecutive resource blocks, for a same transmission direction. In some aspects, "SBFD symbols" are defined as symbols with subbands that a gNB would use for SBFD operation. In some aspects, for SBFD operation within a TDD carrier, an SBFD subband consists of 1 RB or a set of consecutive RBs for the same transmission direction. Additional description of SBFD resources is provided in connection with FIG. 6.

As indicated above, FIG. 5 is provided as an example. Other examples may differ from what is described with regard to FIG. 5.

Figure 6:
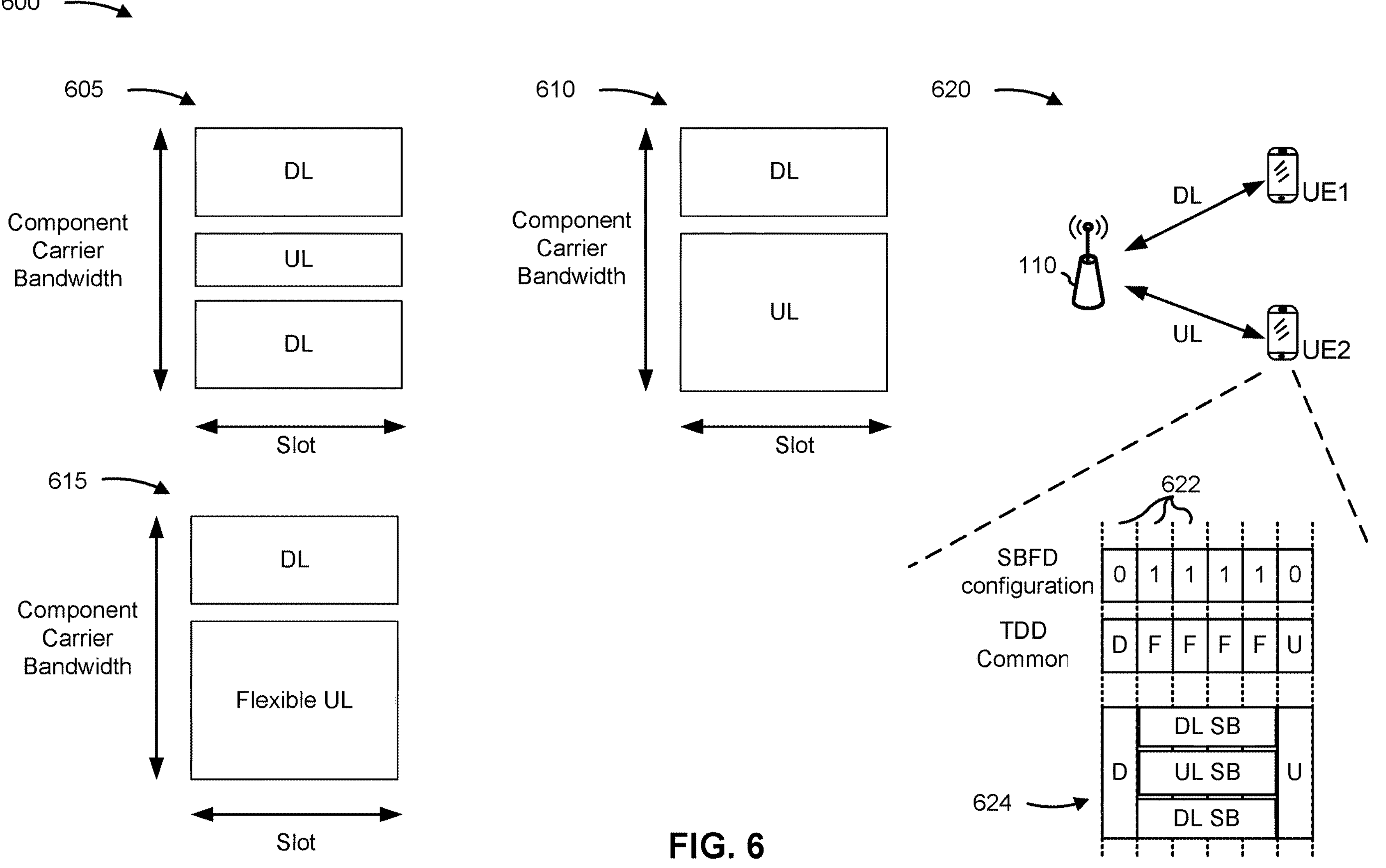
FIG. 6 is a diagram illustrating an example of subband FD (SBFD) resources and communication, in accordance with the present disclosure.

FIG. 6 is a diagram illustrating an example 600 of SBFD resources and communication, in accordance with the present disclosure. FIG. 6 shows examples 605, 610, and 615 of SBFD resources, and an example 620 of a communication configuration between a network node 110 and UEs 1 and 2 (e.g., UEs 120) using an SBFD configuration.

An SBFD resource (that is, a resource having an SBFD format) may include one or more symbols and/or one or more slots. As mentioned above, an SBFD resource may include at least one uplink sub-band (that is, a sub-band used for uplink communication by a UE) and at least one downlink sub-band (that is, a sub-band used for downlink communication by a UE). Example 605 includes two non-contiguous downlink sub-bands and one uplink sub-band. Example 610 includes one downlink sub-band and one uplink sub-band. The two downlink sub-bands of example 605 may be used by a single UE, or may be used by different UEs (e.g., a first UE for a first downlink sub-band and a second UE for a second downlink sub-band). As mentioned above, a sub-band may include one or multiple consecutive resource blocks associated with a transmission direction. Here, example 605 includes two sub-bands associated with a downlink transmission direction and one sub-band associated with an uplink transmission direction, and example 610 includes one sub-band associated with a downlink transmission direction and one sub-band associated with an uplink transmission direction. Examples 605 and 610 may illustrate a symbol having an SBFD format (e.g., a symbol in which there is a set of resource blocks comprising at least one downlink sub-band and a set of resource blocks comprising at least one uplink sub-band), a slot having an SBFD format (e.g., a slot in which there is at least one downlink sub-band and at least one uplink sub-band), or another time resource having an SBFD format.

In a resource with an SBFD format, a network node 110 may perform simultaneous transmission of downlink transmissions and reception of uplink transmissions on a sub-band basis. For example, the network node 110 may simultaneously communicate with UE1 on the downlink and UE2 on the uplink. In some examples, UE1 and/or UE2 may be configured with only the sub-band(s) in use by UE1 and/or UE2 for communication. For example, UE1 may be configured with only downlink sub-bands, and UE2 may be configured with only uplink sub-bands of an SBFD formatted resource. This may be because, for example, UE1 and/or UE2 do not have a capability for SBFD communication. In some examples, UE1 and/or UE2 may be configured to utilize an SBFD formatted resource. For example, if a UE has a capability for SBFD communication, the UE may be aware that a given resource has an SBFD format (while utilizing the resource in only one transmission direction), or may perform FD communication in the given resource.

A resource can be configured to an SBFD format. In some aspects, a resource may be configured to an SBFD format based at least in part on an indication of a change of a format of the resource. For example, a network node may provide signaling indicating that the format of the resource is selected as an SBFD format (similarly to how signaling may indicate that the format is an uplink format, a downlink format, or a flexible format). As another example, a network node may configure one or more sub-bands of the resource such that the resource includes at least one uplink sub-band and at least one downlink sub-band. For example, a network node may reconfigure a sub-band of a slot with a downlink format to be an uplink sub-band, thereby converting the slot to have an SBFD format.

Example 615 shows a downlink subband and a flexible uplink subband. In some cases, a UE can use the uplink subband for uplink transmissions, but may not be scheduled to receive downlink communications in the uplink subband. However, in some cases, a UE can benefit from being able to receive downlink communications in an uplink subband such as, for example, to receive certain types of downlink communications in more than one subband simultaneously and/or for measuring CLI. For example, in some aspects, downlink reception may be provided for downlink scheduling of PDSCH communications, channel state information reference signals (CSI-RSs), and/or PDCCH communications. In some aspects, downlink reception in an uplink subband may be provided for facilitating CLI measurements.

In some aspects, rules may be defined related to what type of signals/channels can be received in an uplink subband. For example, in some aspects, only dynamic communications scheduled by DCI may be received in an uplink subband, while RRC configured downlink communications may be skipped based on having a lower priority level. In some aspects, if the UE has a downlink subband RF filter and needs to tune the downlink subband RF filter (e.g. with D/U subband configuration) or if the UE needs to retune the RF frequency, then a scheduling offset associated with a network node scheduling downlink reception within an uplink subband in a SBFD symbol may be long enough to guarantee enough time for the UE to retune RF hardware and/or a downlink subband filter.

In some aspects, an SBFD-aware UE may perform downlink reception in an uplink subband for inter-UE CLI measurements within the uplink subband and/or dynamic downlink scheduled PDSCH or CSI-RS. In some aspects, downlink reception configured by higher layers (e.g., PDCCH, SPS, periodic or semi-periodic CSI-RS) in an uplink subband may be skipped or dropped except, for example, in a case in which the network node indicates to the UE that the symbols for RRC downlink reception are switched from SBFD symbols to DL-only symbols. In some aspects, the UE may not expect to be configured with a search space monitoring occasion where the associated control resource set (CORESET) overlaps with the uplink subband. In some aspects, the UE may not receive PDCCH where the CORESET associated with a synchronization symbol overlaps with the uplink subband.

In some cases, as shown by reference number 620, a network node 110 may be configured with an SBFD configuration and, thus, may be capable of full duplex communications with two different UEs, each of which may communicate according to a half-duplex configuration. In some cases, although a UE may be configured with a slot format (e.g., via a TDD common configuration (tdd-UL-DL-ConfigurationCommon), as shown). The TDD common configuration may assign a direction format to each time resource 622 (e.g., D. U, and, or F). The slot format can provide a pattern of uplink, downlink, and flexible slots and/or symbols (e.g., within a slot) that may not coincide with communication resources that the network node 110 is to schedule, particularly given that some slots, from the perspective of the network node 110 can be configured for SBFD. Thus, it can be unclear, to a UE, whether to transmit or receive in an SBFD symbol. In some aspects, the TDD uplink-downlink common configuration configures at least one flexible time resource as at least one semi-static SBFD time resource. In some cases, the UE can be semi-statically configured with a transmission and/or reception direction. For example, as shown, an SBFD configuration may indicate, for each time resource 622, whether the time resource is an SBFD time resource or a non-SBFD time resource. A time resource 622 may include a slot and/or a symbol. As shown, for example, a time resource indicated with a “0” may be a non-SBFD time resource, and a time resource indicated with a “1” may be an SBFD time resource, resulting in a subband non-overlapping full duplex configuration 624. In some other cases, the UE can be dynamically indicated with a transmission and/or reception direction. In some other cases, the UE can determine to transmit or receive based on configuration and/or scheduling of transmissions and receptions.

For a SBFD aware UE semi-statically configured with an UL subband in a SBFD symbol configured as DL in TDD-UL-DL-ConfigCommon, in some cases, UL transmissions within the UL subband can be allowed in the symbol, UL transmissions outside the UL subband may not be allowed in the symbol, frequency locations (which can be explicitly indicated or implicitly derived) of DL subband(s) may be known to the SBFD aware UE, and DL receptions within DL subband(s) can be allowed in the symbol. In some cases, UL transmissions can be within active UL bandwidth parts (BWPs) and DL receptions can be within active DL BWPs in the symbol.

For SBFD operation in a symbol configured as flexible in TDD-UL-DL-ConfigCommon, in some cases, UL transmissions within an UL subband can be allowed in the symbol, UL transmissions outside the UL subband may not be allowed in the symbol, frequency locations of DL subband (s) may be known to the SBFD aware UE, and DL receptions within DL subband(s) may be allowed in the symbol. In some cases, UL transmissions within an UL subband may be allowed in the symbol, the RBs outside the UL subband can be used as either UL, or DL excluding guardband(s) if used, in the symbol from gNB’s perspective, and the transmission direction for all those RBs can be the same.

In some cases, options to achieve dynamic SBFD can include a first option in which dynamic SBFD is achieved by a scheduling DCI which is used to indicate whether the RBs in a flexible subband are used for UL transmission or DL transmission. In a second option, dynamic SBFD can be achieved by a scheduling DCI which is used to determine whether DL receptions outside a semi-statically configured DL subband and/or UL transmission outside a semi-statically configured UL subband are allowed. In a third option, dynamic SBFD can be achieved by non-scheduling DCI which indicates whether a symbol is an SBFD symbol or not. Non-scheduling DCI can be DCI that does not schedule data or a configured grant (GC)-DCI, e.g., an SFI (e.g., a D in an SFI means to update an SBFD symbol to a D symbol and a U in an SFI means to update an SBFD symbol to a U symbol). In a fourth option, dynamic SBFD can be achieved by a MAC control element (MAC CE) which indicates whether a symbol is an SBFD symbol or not.

In some cases, for an SBFD aware UE semi-statically configured with an UL subband in an SBFD symbol which is configured as DL or flexible in TDD-UL-DL-ConfigCommon, if dynamic SBFD with either of the four options described above is implemented, the dynamic SBFD will fallback/remove the SBFD symbol to a legacy symbol, or add more SBFD symbols on legacy D or F symbols dynamically. Dynamic SBFD can increase the scheduling flexibility based on traffic need and resource utilization and based on FD capability (e.g., if no UL traffic to transmit in an UL subband, an SBFD symbol can fallback to legacy D symbol for DL traffic). However, dynamic SBFD operation can create additional inter-UE CLI to the DL UE. For example, if an SBFD symbol falls back to a legacy D symbol for DL traffic only, a DL UE can receive in-band inter-UE CLI in UL SB RBs from a neighbor UE transmitting in an UL subband.

Some aspects of the techniques described herein may include supporting dynamic CLI measurements triggered by dynamic SBFD signaling and/or operation. For example, in some aspects, a UE may receive configuration information indicative of an SBFD configuration associated with at least one time resource semi-statically configured as an SBFD time resource. The configuration information may indicate a CLI measurement resource. The UE may receive a dynamic SBFD update indication associated with the at least one time resource and may perform a CLI measurement associated with an updated CLI measurement resource based on the dynamic SBFD update indication. In this way, a UE may autonomously update a CLI measurement resource to facilitate measuring CLI due to dynamic SBFD updates, thereby enabling support of CLI mitigation in dynamic SBFD operations and, thus, positively impacting network performance.

As indicated above, FIG. 6 is provided as an example. Other examples may differ from what is described with regard to FIG. 6.

FIGS. 7A-7J are diagrams illustrating examples associated with updating CLI resources based on a dynamic SBFD update, in accordance with the present disclosure.

Figure 7A:
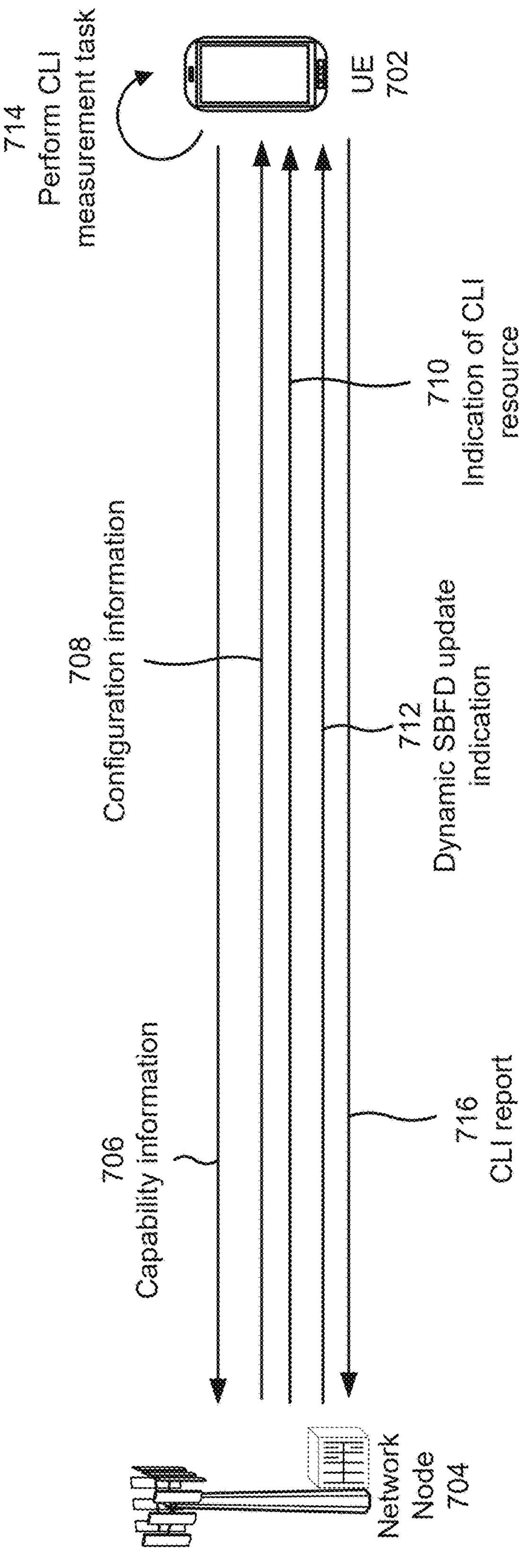

FIG. 7A is a diagram illustrating an example 700 associated with updating CLI resources based on a dynamic SBFD update, in accordance with the present disclosure. As shown in FIG. 7A, a UE 702 and a network node 704 may communicate with one another. The UE 702 may be, be similar to, include, or be included in, the UE1 and/or the UE2 depicted in FIG. 6, the UE 402 depicted in FIGS.

4A-4D, and/or the UE 120 depicted in FIGS. 1-3. The network node 704 may be, be similar to, include, or be included in, the network node 110 depicted in FIG. 6, the network node 404 depicted in FIGS. 4A-4D, the network node 110 depicted in FIGS. 1-2, and/or one or more components of the disaggregated base station architecture 300 depicted in FIG. 3.

As shown by reference number 706, the UE 702 may transmit, and the network node 704 may receive, capability information. In some aspects, the capability information may be indicative of a capability of the UE 702 to be configured with an SBFD configuration. In some aspects, the capability information may be indicative of a capability of the UE 702 to measure CLI based on updated SBFD configurations.

As shown by reference number 708, the network node 704 may transmit, and the UE 702 may receive, configuration information. In some aspects, the configuration information may be based on the capability information. The configuration information may include an SBFD-aware configuration. In some aspects, the SBFD-aware configuration may configure one or more attributes of an uplink subband, one or more guard bands, and/or one or more downlink subbands, among other examples. In some aspects, the configuration information may be indicative of an SBFD configuration associated with at least one resource semi-statically configured as an SBFD time resource. The at least one resource may include a time resource and/or a frequency resource. In some aspects, the at least one resource may include a time and frequency resource (a resource including both a time component and a frequency component).

As shown by reference number 710, the network node 704 may transmit, and the UE 702 may receive, an indication of a CLI resource. For example, in some aspects, the indication may be provided as part of a CLI report configuration and/or a CLI measurement configuration. In some aspects, the CLI resource may include a CLI measurement resource (e.g., a time and/or frequency resource in which the UE 702 is to obtain one or more CLI measurements) and/or a CLI transmission resource (e.g., a time and/or frequency resource in which the UE 702 is to transmit a CLI reference signal such as a CLI sounding reference signal (SRS)).

As shown by reference number 712, the network node 704 may transmit, and the UE 702 may receive, a dynamic SBFD update indication. The dynamic SBFD update indication may be associated with the at least one resource. In some aspects, the dynamic SBFD update indication may include DCI. The DCI may schedule a downlink communication. In some aspects, the DCI may schedule at least one of a PDSCH or a CSI-RS. In some aspects, the DCI may be group common (GC) DCI. In some aspects, the DCI may be non-scheduling DCI. In some aspects, the dynamic SBFD update indication may be associated with converting the at least one SBFD resource to a downlink resource. For example, the dynamic SBFD update indication may indicate a conversion of the at least one SBFD resource to a downlink resource. In some aspects, the dynamic SBFD update indication may be associated with converting the at least one SBFD resource to an uplink resource. For example, the dynamic SBFD update indication may indicate a conversion of the at least one SBFD resource to an uplink resource. In some aspects, the dynamic SBFD update indication may be associated with adding at least one additional SBFD resource to a downlink and/or uplink resource.

As shown by reference number 714, the UE 702 may perform a CLI measurement task. For example, in some aspects, the UE 702 may perform a CLI measurement task associated with an updated CLI resource based on the dynamic SBFD update indication. In some aspects, the UE 702 may perform the CLI measurement task by obtaining one or more CLI measurements associated with the updated CLI resource. In some aspects, the UE 702 may perform the CLI measurement task by transmitting one or more CLI reference signals (e.g., a CLI SRS).

As shown by reference number 716, the UE 702 may transmit, and the network node 704 may receive, a CLI report. For example, in some aspects, the CLI report may indicate obtained CLI measurement values. In some aspects, the CLI report may be based on an updated CLI configuration, which may be based on the dynamic SBFD update indication. For example, in some aspects, the UE 702 may update a CLI report configuration to indicate reporting obtained CLI measurements corresponding to the updated CLI resource.

Figure 7B:
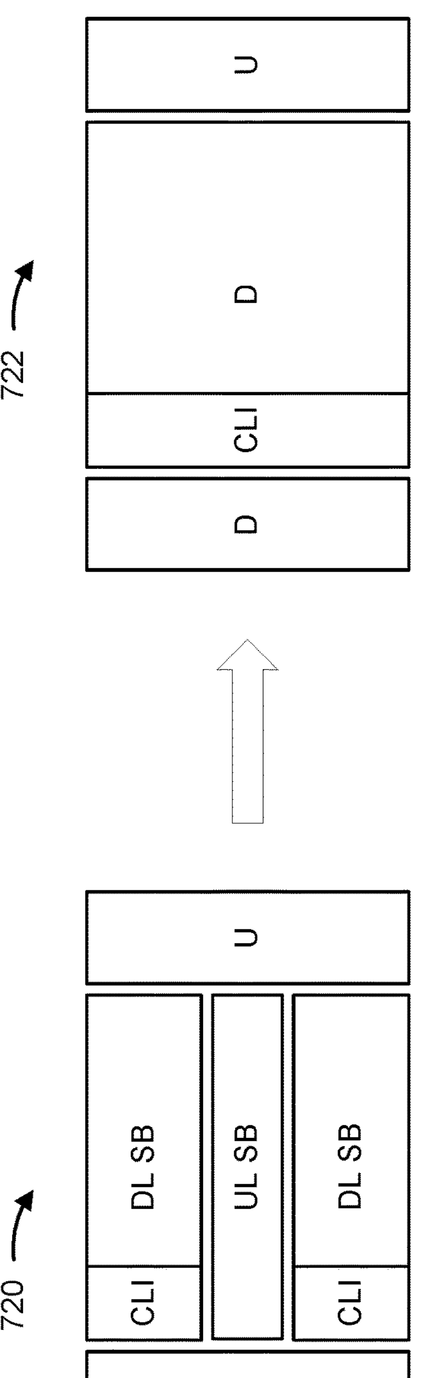
Figure 7B:

FIG. 7B is a diagram illustrating an example 718 associated with updating CLI resources based on a dynamic SBFD update indication, in accordance with the present disclosure. In some aspects, for example, the dynamic SBFD update indication may be associated with converting the SBFD resource to a downlink resource. For example, the CLI resource may include a first downlink CLI measurement resource and the updated CLI resource may include a second downlink CLI measurement resource. As shown by reference number 720, the first downlink CLI measurement resource may be associated with at least one downlink subband (e.g., one downlink subband or two downlink subbands). As shown by reference number 722, the second downlink CLI measurement resource may be associated with a downlink bandwidth part (indicated as "D").

For example, in some aspects, for an SBFD-aware UE semi-statically configured with a UL subband ("UL SB") in an SBFD symbol configured as DL in a TDD-UL-DL-ConfigCommon configuration, the SBFD update indication may indicate the UE to fallback from the SBFD symbol(s) to legacy D symbol(s). In this case, for example, a DL reception (RX) UE may autonomously update the CLI measurement resource on associated occasion(s). In this way, the UE may update from a CLI configuration indicating a measurement of CLI RSSI on DL SBs for leakage to measuring CL RSSI on a DL BWP. In some aspects, a corresponding CLI report configuration may be automatously updated as well, e.g. from a per-DL subband report to a wideband (WB) CLI report. In some aspects, one or more report metrics may be updated as well.

Figure 7C:
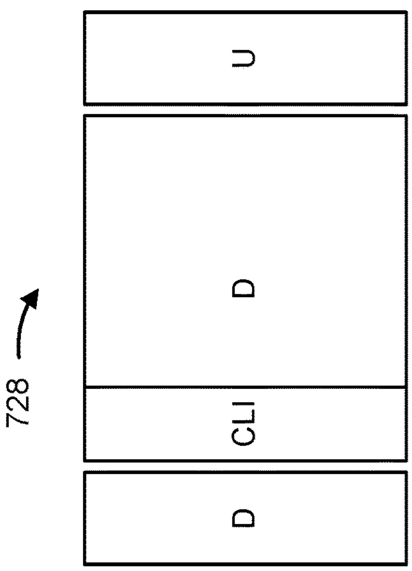
Figure 7C:
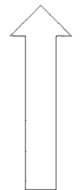
Figure 7C:
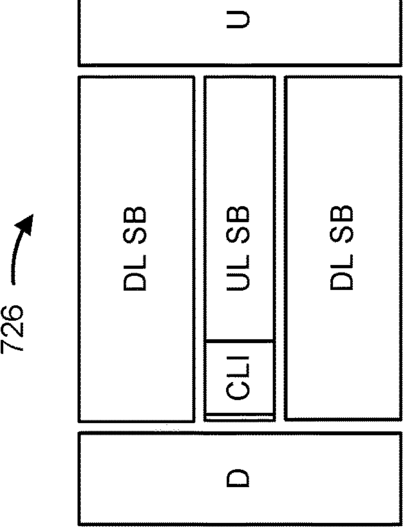

FIG. 7C is a diagram illustrating another example 724 associated with updating CLI resources based on a dynamic SBFD update indication, in accordance with the present disclosure. In some aspects, as shown by reference number 726, the CLI resource may include a CLI measurement resource associated with an uplink subband and, as shown by reference number 728, the updated CLI resource may include a CLI measurement resource associated with a downlink bandwidth part. For example, in some aspects, for an SBFD-aware UE semi-statically configured with an UL subband in an SBFD symbol configured as DL in TDD-UL-DL-ConfigCommon, the dynamic SBFD indication may indicate the UE to fallback from SBFD symbol(s) to legacy D symbol(s). In this case, the UE may autonomously update the CLI measurement resource on associated occasion(s) (e.g., to update from measuring CLI RSSI or CLI RSRP on an UL SB for in-band blocker to measuring CLI RSSI on a DL BWP). In some aspects, a corresponding CLI report configuration may be automatously updated as well (e.g., from a per-UL subband report to a WB CLI report). In some aspects, the report metric may be updated as well (e.g., from an UL RSRP metric to a WB RSSI metric).

FIG. 7D is a diagram illustrating another example 730 associated with updating CLI resources based on a dynamic SBFD update indication, in accordance with the present disclosure. For example, as shown by reference number 732, the at least one resource (e.g., CLI resource) may include a flexible resource associated with a semi-statically configured uplink subband. The dynamic SBFD update indication may be associated with converting the SBFD resource to an uplink resource, and, as shown by reference number 734, the updated CLI resource may include a CLI transmission resource (e.g., associated with an uplink BWP).

In some aspects, the CLI transmission resource may include a CLI SRS resource. In some aspects, the UE may be further configured to refrain from performing a CLI measurement associated with at least one flexible subband based on the dynamic SBFD update indication. For example, in some aspects, for an SBFD-aware UE semi-statically configured with an UL subband in an SBFD symbol configured as Fin TDD-UL-DL-ConfigCommon, the dynamic SBFD update indication may indicate the UE to update SBFD symbol(s) to legacy U symbol(s). In some aspects, an UL transmission (Tx) UE may autonomously update a Tx CLI SRS resource on associated occasion(s) (e.g., from Tx SRS on UL SB to Tx SRS in an UL BWP for a DL UE to measure wideband CLI). In some aspects, a DL Rx UE may autonomously cancel and/or skip the CLI measurement resource (for reception) on associated occasion(s) (e.g., on F SB(s) due to no more DL SB(s) after the dynamic SBFD update).

Figure 7E:
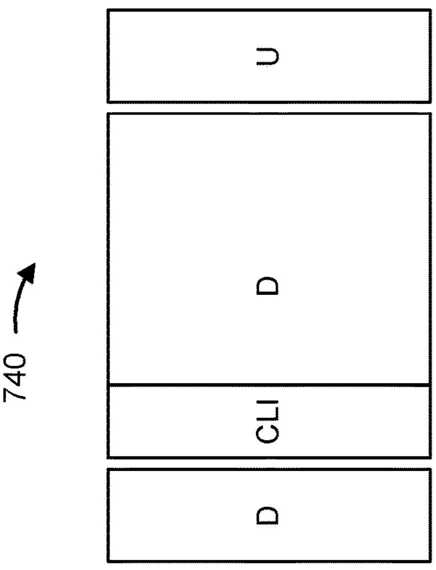
Figure 7E:
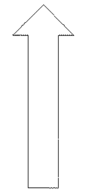
Figure 7E:
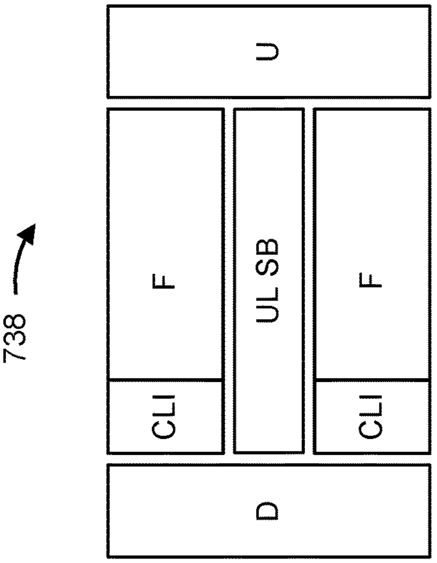

FIG. 7E is a diagram illustrating another example 736 associated with updating CLI resources based on a dynamic SBFD update indication, in accordance with the present disclosure. In some aspects, as shown by reference number 738, the at least one resource may include a flexible resource associated with a semi-statically configured uplink subband, and as shown by reference number 740, the dynamic SBFD update indication may be associated with converting the SBFD resource to a downlink resource. For example, the downlink resource may be associated with a downlink BWP. As shown, the CLI resource may include a flexible CLI measurement resource and the updated CLI resource may include a downlink measurement resource. The flexible CLI measurement resource may be associated with at least one flexible subband and the downlink measurement resource may be associated with a downlink BWP.

For example, in some aspects, for an SBFD-aware UE semi-statically configured with an UL subband in an SBFD symbol configured as Fin TDD-UL-DL-ConfigCommon, the dynamic SBFD update indication may indicate the UE to update SBFD symbol(s) to legacy D symbol(s). In this a DL RX UE may autonomously update the CLI measurement resource on associated occasion(s) (e.g., from measuring CLI RSSI on F SBs for leakage to measuring wideband CLI RSSI on a DL BWP).

FIG. 7F is a diagram illustrating another example 742 associated with updating CLI resources based on a dynamic SBFD update indication, in accordance with the present disclosure. In some aspects, the network node 704 may transmit (e.g., as the dynamic SBFD update indication), and the UE 702 may receive, a slot format indicator (SFI). For example, as shown by reference number 744, the CLI resource may be associated with at least one flexible subband and, as shown by reference number 746, the updated CLI resource may include a downlink measurement resource based on receiving the SFI. For example, in some aspects, for an SBFD-aware UE semi-statically configured with an UL subband in an SBFD symbol configured as Fin TDD-UL-DL-ConfigCommon, the dynamic SBFD update indication may indicate the UE to update SBFD symbol(s) to legacy F symbol(s). In this case, for example, a DL RX UE may autonomously update the CLI measurement resource on associated occasion(s) (e.g., from measuring CLI RSSI on F SBs for leakage to measuring CLI RSSI on a BWP). In some aspects, this operation may further depend on whether the F symbol will be further updated to D by an SFI indication.

Figure 7G:
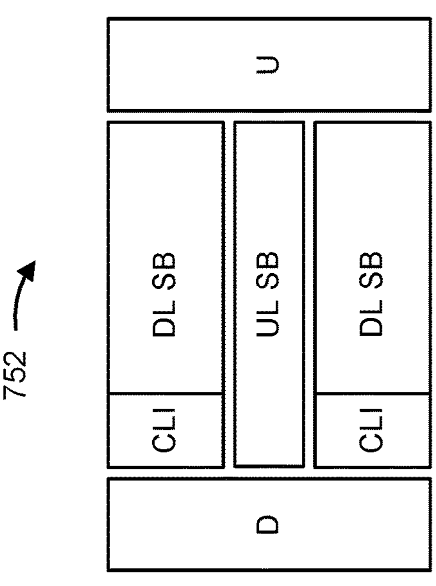
Figure 7G:
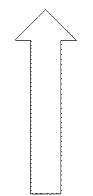
Figure 7G:
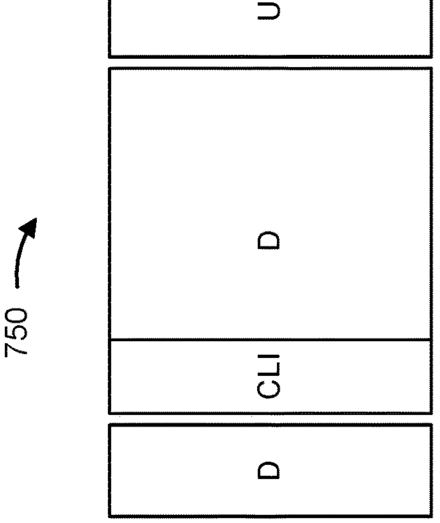

FIG. 7G is a diagram illustrating another example 748 associated with updating CLI resources based on a dynamic SBFD update indication, in accordance with the present disclosure. In some aspects, the dynamic SBFD update indication may be associated with adding at least one additional SBFD resource to a downlink resource. For example, as shown by reference number 750, the CLI resource may include a downlink BWP resource and, as shown by reference number 752, the updated CLI resource may include a wideband resource associated with at least one downlink subband. For example, in some aspects, for an SBFD-aware UE semi-statically configured with an UL subband in an SBFD symbol configured as DL in TDD-UL-DL-ConfigCommon, the dynamic SBFD update indication may indicate the UE to add more SBFD symbol(s) on legacy D symbol(s). In this case, for example, the UE may autonomously update the CLI measurement resource on associated occasion(s) (e.g., from a DL BWP to measure wideband CLI RSSI to DL SB(s) to measure CLI RSSI for leakage after the dynamic SBFD indication).

Figure 7H:
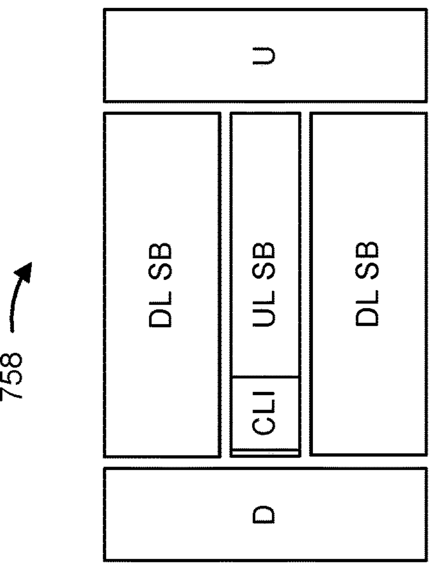
Figure 7H:
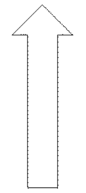
Figure 7H:
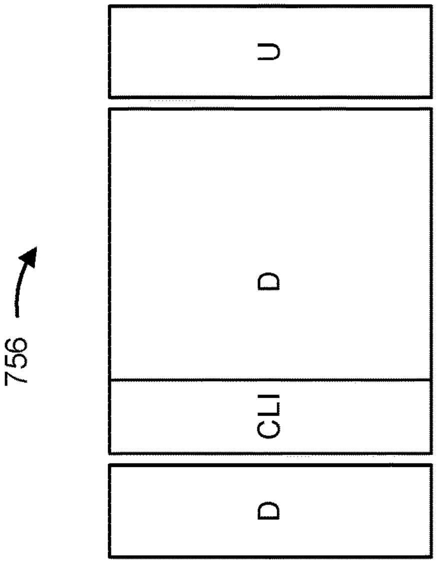

FIG. 7H is a diagram illustrating another example 754 associated with updating CLI resources based on a dynamic SBFD update indication, in accordance with the present disclosure. In some aspects, as shown by reference number 756, the CLI resource may include a downlink BWP resource and, as shown by reference number 758, the updated CLI resource may include a measurement resource associated with an uplink subband. For example, in some aspects, for an SBFD-aware UE semi-statically configured with an UL subband in an SBFD symbol configured as DL in TDD-UL-DL-ConfigCommon, the dynamic SBFD update indication may indicate the UE to add more SBFD symbol(s) on legacy D symbol(s). In this case, for example, a UE may autonomously update the CLI measurement resource on associated occasion(s) (e.g., from a DL BWP to measure wideband CLI RSSI to an UL SB for measuring CLI RSSI or CLI RSRP for in-band blocker after dynamic SBFD indication).

Figure 7I:
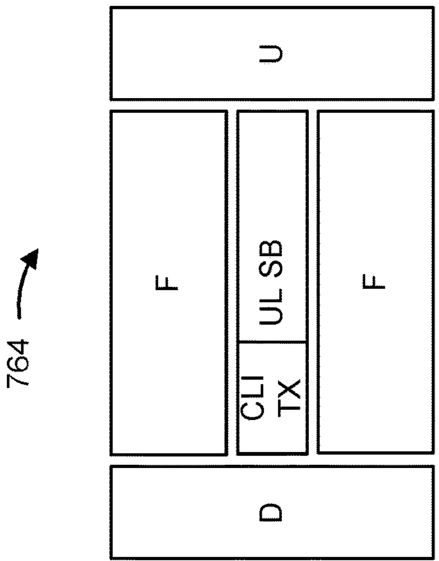
Figure 7I:
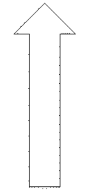
Figure 7I:
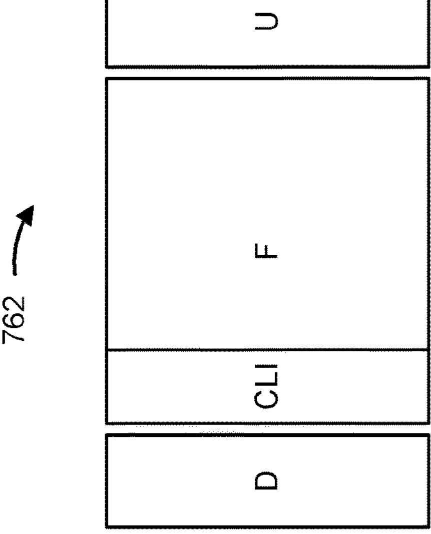

FIG. 7I is a diagram illustrating another example 760 associated with updating CLI resources based on a dynamic SBFD update indication, in accordance with the present disclosure. In some aspects, as shown by reference number 762, for example, the CLI resource may be associated with a downlink BWP and, as shown by reference number 764, the updated CLI resource may be associated with at least one of a flexible subband or an uplink subband. For example, in some aspects, for an SBFD-aware UE semi-statically configured with an UL subband in an SBFD symbol configured as F in TDD-UL-DL-ConfigCommon, the dynamic SBFD update indication may indicate the UE to add more SBFD symbol(s) on legacy F symbol(s). In this case, for example, a UE may autonomously update the CLI measurement resource on associated occasion(s) (e.g., from a BWP for measuring wideband CLI RSSI to DL SB(s) for measuring CLI RSSI for leakage and/or for measuring CLI RSRP/RSSI for in-band blocker after dynamic SBFD indication).

In some aspects, the UE may receive a CLI measurement resource update indication, where the updated CLI resource is based on the CLI measurement resource update indication. For the aspects described above in connection with FIGS. 7A-7I, the network node 704 may provide an explicit indication. In some examples, in one configuration with periodicity 1, CLI measurement may be configured in DL subbands only, and in another configuration with periodicity 2, CLI measurement may be configured in UL subbands only. The network node 704 may indicate whether to follow the configuration 1 or the configuration 2 (e.g., in a reportConfig signaling or separate signaling).

Figure 7J:
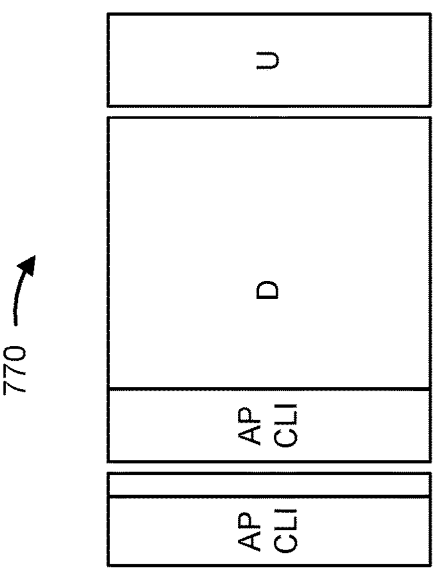
Figure 7J:
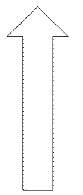
Figure 7J:
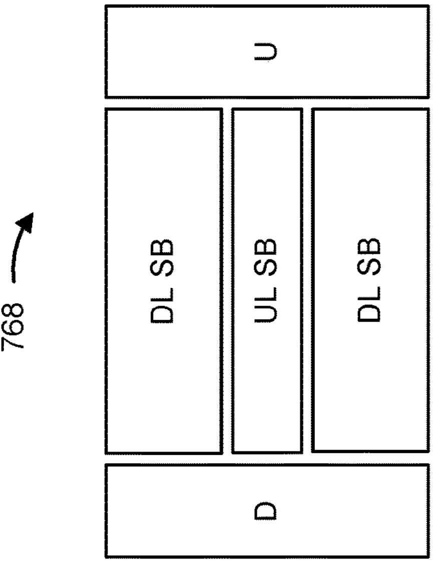

FIG. 7J is a diagram illustrating another example 766 associated with updating CLI resources based on a dynamic SBFD update indication, in accordance with the present disclosure. In some aspects, the network node 704 may transmit, and the UE 702 may receive, an aperiodic CLI trigger signal. For example, performing the CLI measurement task may include performing the CLI measurement task based on (e.g., in response to receipt of) the aperiodic CLI trigger signal. For example, as shown by reference number 768, in some aspects, a first slot configuration may be associated with the configuration information and may omit a CLI resource. As shown by reference number 770, a second slot configuration may be associated with the dynamic SBFD update indication and include the updated CLI resource. In some aspects, the SBFD update indication may include DCI including a first group common (GC) DCI and a second GC DCI. In some aspects, receiving the aperiodic CLI trigger signal may include receiving the aperiodic CLI trigger signal prior to receiving the dynamic SBFD update indication. In some aspects, receiving the aperiodic CLI trigger signal may include receiving the aperiodic CLI trigger signal subsequent to receiving the dynamic SBFD update indication. In some aspects, receiving the dynamic SBFD update indication may include receiving first GC DCI, and receiving the aperiodic CLI trigger signal may include receiving at least one of second GC DCI or a dedicated aperiodic (AP) trigger signal.

For example, in some aspects, GC DCI 1 (e.g. SFI) may perform dynamic SBFD update on one or more semi-static configured SBFD symbols (in a periodic slot format, or one or more symbols/slots, or in 1 bit (fallback to legacy D in all following SBFD symbols)). In addition, GC DCI 2/dedicated AP CLI trigger signaling may trigger additional AP CLI measurement (before the dynamic SBFD update or after) to measure CLI based on dynamic SBFD update—the trigger can be for measurement DL UE and/or Tx UL UE. For example, the network node may indicate the UE to fallback from SBFD symbol(s) to legacy D symbol(s) as dynamic SBFD operation, then AP wideband CLI measurement may be triggered on the fall backed legacy D symbol (s). Any number of other dynamic SBFD updates may be configured to trigger AP CLI measurement.

In some aspects, the aperiodic CLI trigger signal may include GC DCI including a first GC DCI format and a second GC DCI format. In some aspects, receiving the aperiodic CLI trigger signal may include receiving at least one of scheduling DCI, non-scheduling DCI, or a MAC CE. In some aspects, AP CLI measurement (additional) may be triggered by dynamic SBFD signaling or separate signaling associated with dynamic SBFD operation.

As indicated above, FIGS. 7A-7J are provided as examples. Other examples may differ from what is described with respect to FIGS. 7A-7J.

Figure 8:
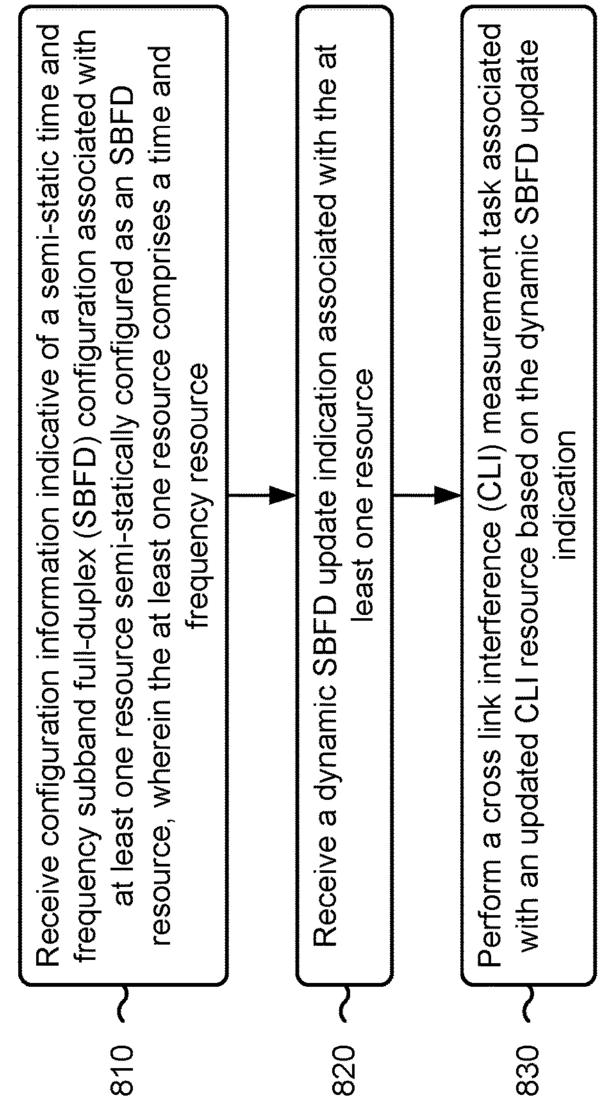
FIG. 8 is a diagram illustrating an example process performed, for example, at a UE or an apparatus of a UE, in accordance with the present disclosure.
Figure 8:

FIG. 8 is a diagram illustrating an example process 800 performed, for example, at a UE or an apparatus of a UE, in accordance with the present disclosure. Example process 800 is an example where the apparatus or the UE (e.g., UE 702) performs operations associated with techniques for updating CLI resources based on a dynamic SBFD update.

As shown in FIG. 8, in some aspects, process 800 may include receiving configuration information indicative of a semi-static time and frequency SBFD configuration associated with at least one resource semi-statically configured as an SBFD resource, wherein the at least one resource comprises a time and frequency resource (block 810). For example, the UE (e.g., using reception component 1002 and/or communication manager 1006, depicted in FIG. 10) may receive configuration information indicative of a semi-static time and frequency SBFD configuration associated with at least one resource semi-statically configured as an SBFD resource, wherein the at least one resource comprises a time and frequency resource, as described above.

As further shown in FIG. 8, in some aspects, process 800 may include receiving a dynamic SBFD update indication associated with the at least one resource (block 820). For example, the UE (e.g., using reception component 1002 and/or communication manager 1006, depicted in FIG. 10) may receive a dynamic SBFD update indication associated with the at least one resource, as described above.

As further shown in FIG. 8, in some aspects, process 800 may include performing a CLI measurement task associated with an updated CLI resource based on the dynamic SBFD update indication (block 830). For example, the UE (e.g., using communication manager 1006, depicted in FIG. 10) may perform a CLI measurement task associated with an updated CLI resource based on the dynamic SBFD update indication, as described above.

Process 800 may include additional aspects, such as any single aspect or any combination of aspects described below and/or in connection with one or more other processes described elsewhere herein.

In a first aspect, the dynamic SBFD update indication is associated with converting the SBFD resource to a downlink resource. In a second aspect, alone or in combination with the first aspect, process 800 includes receiving an indication of a CLI resource, wherein the CLI resource comprises a first downlink CLI measurement resource and wherein the updated CLI resource comprises a second downlink CLI measurement resource. In a third aspect, alone or in combination with one or more of the first and second aspects, the first downlink CLI measurement resource is associated with at least one downlink subband and wherein the second downlink CLI measurement resource is associated with a downlink bandwidth part. In a fourth aspect, alone or in combination with one or more of the first through third aspects, process 800 includes receiving an indication of a CLI resource, wherein the CLI resource comprises a CLI measurement resource associated with an uplink subband and wherein the updated CLI resource comprises a CLI measurement resource associated with a downlink bandwidth part.

In a fifth aspect, alone or in combination with one or more of the first through fourth aspects, the at least one resource comprises a flexible resource associated with a semi-statically configured uplink subband, wherein the dynamic SBFD update indication is associated with converting the SBFD resource to an uplink resource, and wherein the updated CLI resource comprises a CLI transmission resource. In a sixth aspect, alone or in combination with one or more of the first through fifth aspects, uplink resource is associated with an uplink bandwidth part. In a seventh aspect, alone or in combination with one or more of the first through sixth aspects, CLI transmission resource comprises a CLI SRS resource, the method further comprising transmitting an SRS using the CLI SRS resource based on the dynamic SBFD update indication. In an eighth aspect, alone or in combination with one or more of the first through seventh aspects, process 800 includes refraining from performing a CLI measurement associated with at least one flexible subband based on the dynamic SBFD update indication. In a ninth aspect, alone or in combination with one or more of the first through eighth aspects, the at least one resource comprises a flexible resource associated with a semi-statically configured uplink subband, and wherein the dynamic SBFD update indication is associated with converting the SBFD resource to a downlink resource. In a tenth aspect, alone or in combination with one or more of the first through ninth aspects, the downlink resource is associated with a downlink bandwidth part.

In an eleventh aspect, alone or in combination with one or more of the first through tenth aspects, process 800 includes receiving an indication of a CLI resource, wherein the CLI resource comprises a flexible CLI measurement resource and wherein the updated CLI resource comprises a downlink measurement resource. In a twelfth aspect, alone or in combination with one or more of the first through eleventh aspects, the flexible CLI measurement resource is associated with at least one flexible subband and wherein the downlink measurement resource is associated with a downlink bandwidth part. In a thirteenth aspect, alone or in combination with one or more of the first through twelfth aspects, process 800 includes receiving an SFI, wherein the updated CLI resource comprises a downlink measurement resource based on receiving the SFI. In a fourteenth aspect, alone or in combination with one or more of the first through thirteenth aspects, the dynamic SBFD update indication is associated with adding at least one additional SBFD resource to a downlink resource.

In a fifteenth aspect, alone or in combination with one or more of the first through fourteenth aspects, process 800 includes receiving an indication of a CLI resource, wherein the CLI resource comprises a downlink bandwidth part resource and wherein the updated CLI resource comprises a wideband resource associated with at least one downlink subband. In a sixteenth aspect, alone or in combination with one or more of the first through fifteenth aspects, process 800 includes receiving an indication of a CLI resource, wherein the CLI resource comprises a downlink bandwidth part resource and wherein the updated CLI resource comprises a measurement resource associated with an uplink subband. In a seventeenth aspect, alone or in combination with one or more of the first through sixteenth aspects, the CLI resource is associated with a downlink bandwidth part and wherein the updated CLI resource is associated with at least one of a flexible subband or an uplink subband. In an eighteenth aspect, alone or in combination with one or more of the first through seventeenth aspects, process 800 includes receiving a CLI measurement resource update indication, wherein the updated CLI resource is based on the CLI measurement resource update indication.

In a nineteenth aspect, alone or in combination with one or more of the first through eighteenth aspects, process 800 includes receiving an aperiodic CLI trigger signal, wherein performing the CLI measurement task further comprises performing the CLI measurement task based on the aperiodic CLI trigger signal. In a twentieth aspect, alone or in combination with one or more of the first through nineteenth aspects, a first slot configuration is associated with the configuration information and omits a CLI resource, and wherein a second slot configuration is associated with the dynamic SBFD update indication and includes the updated CLI resource. In a twenty-first aspect, alone or in combination with one or more of the first through twentieth aspects, performing the CLI measurement task comprises obtaining a CLI measurement. In a twenty-second aspect, alone or in combination with one or more of the first through twenty-first aspects, performing the CLI measurement task comprises transmitting a CLI reference signal.

In a twenty-third aspect, alone or in combination with one or more of the first through twenty-second aspects, the SBFD update indication comprises DCI including a first GC DCI and a second GC DCI. In a twenty-fourth aspect, alone or in combination with one or more of the first through twenty-third aspects, the SBFD resource is associated with at least one of a downlink subband or an uplink subband and wherein the updated CLI resource is associated with at least one downlink bandwidth part. In a twenty-fifth aspect, alone or in combination with one or more of the first through twenty-fourth aspects, receiving the aperiodic CLI trigger signal comprises receiving the aperiodic CLI trigger signal prior to receiving the dynamic SBFD update indication. In a twenty-sixth aspect, alone or in combination with one or more of the first through twenty-fifth aspects, receiving the aperiodic CLI trigger signal comprises receiving the aperiodic CLI trigger signal subsequent to receiving the dynamic SBFD update indication. In a twenty-seventh aspect, alone or in combination with one or more of the first through twenty-sixth aspects, receiving the dynamic SBFD update indication comprises receiving first GC DCI, and wherein receiving the aperiodic CLI trigger signal comprises receiving at least one of second GC DCI or a dedicated aperiodic trigger signal. In a twenty-eighth aspect, alone or in combination with one or more of the first through twenty-seventh aspects, the aperiodic CLI trigger signal comprises GC DCI including a first GC DCI format and a second GC DCI format, and wherein receiving the dynamic SBFD update indication comprises receiving the GC DCI.

In a twenty-ninth aspect, alone or in combination with one or more of the first through twenty-eighth aspects, receiving the aperiodic CLI trigger signal comprises receiving at least one of scheduling DCI, non-scheduling DCI, or a MAC CE. In a thirtieth aspect, alone or in combination with one or more of the first through twenty-ninth aspects, the aperiodic CLI trigger signal is associated with at least one of the UE or a group of UEs including the UE. In a thirty-first aspect, alone or in combination with one or more of the first through thirtieth aspects, process 800 includes transmitting a CLI report based on an updated CLI report configuration, wherein the updated CLI report configuration is based on the dynamic SBFD update indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
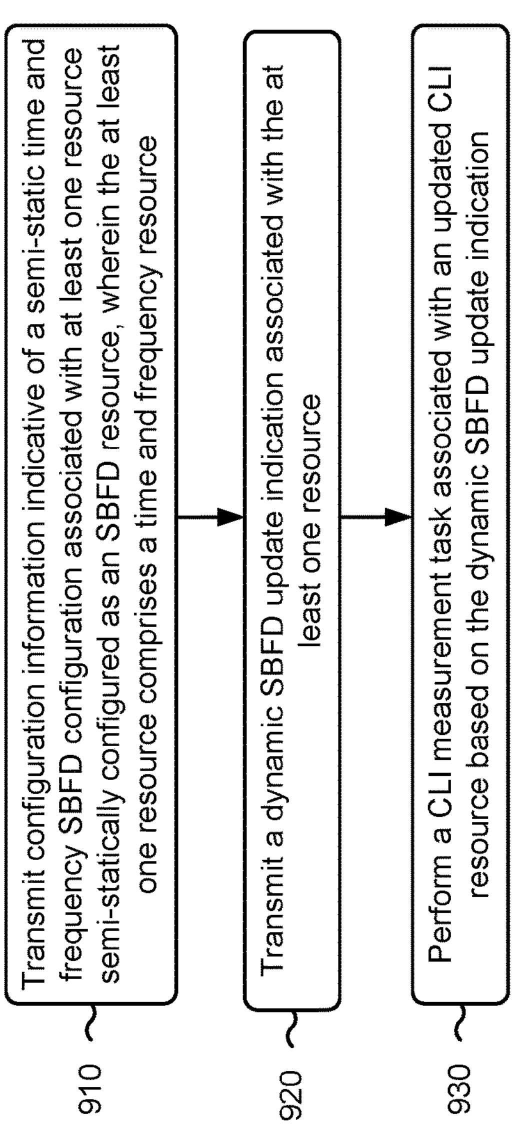
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 704) performs operations associated with techniques for updating CLI resources based on a dynamic SBFD update.

As shown in FIG. 9, in some aspects, process 900 may include transmitting configuration information indicative of a semi-static time and frequency SBFD configuration associated with at least one resource semi-statically configured as an SBFD resource, wherein the at least one resource comprises a time and frequency resource (block 910). For example, the network node (e.g., using transmission component 1104 and/or communication manager 1106, depicted in FIG. 11) may transmit configuration information indicative of a semi-static time and frequency SBFD configuration associated with at least one resource semi-statically configured as an SBFD resource, wherein the at least one resource comprises a time and frequency resource, as described above.

As further shown in FIG. 9, in some aspects, process 900 may include transmitting a dynamic SBFD update indication associated with the at least one resource (block 920). For example, the network node (e.g., using transmission component 1104 and/or communication manager 1106, depicted in FIG. 11) may transmit a dynamic SBFD update indication associated with the at least one resource, as described above.

As further shown in FIG. 9, in some aspects, process 900 may include performing a CLI measurement task associated with an updated CLI resource based on the dynamic SBFD update indication (block 930). For example, the network node (e.g., using communication manager 1106, depicted in FIG. 11) may perform a CLI measurement task associated with an updated CLI resource based on the dynamic SBFD update indication, as described above.

Process 900 may include additional aspects, such as any single aspect or any combination of aspects described below and/or in connection with one or more other processes described elsewhere herein.

In a first aspect, the dynamic SBFD update indication is associated with converting the SBFD resource to a downlink resource. In a second aspect, alone or in combination with the first aspect, process 900 includes transmitting an indication of a CLI resource, wherein the CLI resource comprises a first downlink CLI measurement resource and wherein the updated CLI resource comprises a second downlink CLI measurement resource. In a third aspect, alone or in combination with one or more of the first and second aspects, the first downlink CLI measurement resource is associated with at least one downlink subband and wherein the second downlink CLI measurement resource is associated with a downlink bandwidth part. In a fourth aspect, alone or in combination with one or more of the first through third aspects, process 900 includes transmitting an indication of a CLI resource, wherein the CLI resource comprises a CLI measurement resource associated with an uplink subband and wherein the updated CLI resource comprises a CLI measurement resource associated with a downlink bandwidth part. In a fifth aspect, alone or in combination with one or more of the first through fourth aspects, the at least one resource comprises a flexible resource associated with a semi-statically configured uplink subband, wherein the dynamic SBFD update indication is associated with converting the SBFD resource to an uplink resource, and wherein the updated CLI resource comprises a CLI transmission resource. In a sixth aspect, alone or in combination with one or more of the first through fifth aspects, uplink resource is associated with an uplink bandwidth part.

In a seventh aspect, alone or in combination with one or more of the first through sixth aspects, CLI transmission resource comprises a CLI SRS resource, the method further comprising receiving an SRS using the CLI SRS resource based on the dynamic SBFD update indication. In an eighth aspect, alone or in combination with one or more of the first through seventh aspects, the at least one resource comprises a flexible resource associated with a semi-statically configured uplink subband, and wherein the dynamic SBFD update indication is associated with converting the SBFD resource to a downlink resource. In a ninth aspect, alone or in combination with one or more of the first through eighth aspects, the downlink resource is associated with a downlink bandwidth part. In a tenth aspect, alone or in combination with one or more of the first through ninth aspects, process 900 includes transmitting an indication of a CLI resource, wherein the CLI resource comprises a flexible CLI measurement resource and wherein the updated CLI resource comprises a downlink measurement resource. In an eleventh aspect, alone or in combination with one or more of the first through tenth aspects, the flexible CLI measurement resource is associated with at least one flexible subband and wherein the downlink measurement resource is associated with a downlink bandwidth part.

In a twelfth aspect, alone or in combination with one or more of the first through eleventh aspects, process 900 includes transmitting an SFI, wherein the updated CLI resource comprises a downlink measurement resource based on receiving the SFI. In a thirteenth aspect, alone or in combination with one or more of the first through twelfth aspects, the dynamic SBFD update indication is associated with adding at least one additional SBFD resource to a downlink resource. In a fourteenth aspect, alone or in combination with one or more of the first through thirteenth aspects, process 900 includes transmitting an indication of a CLI resource, wherein the CLI resource comprises a downlink bandwidth part resource and wherein the updated CLI resource comprises a wideband resource associated with at least one downlink subband. In a fifteenth aspect, alone or in combination with one or more of the first through fourteenth aspects, process 900 includes transmitting an indication of a CLI resource, wherein the CLI resource comprises a downlink bandwidth part resource and wherein the updated CLI resource comprises a measurement resource associated with an uplink subband. In a sixteenth aspect, alone or in combination with one or more of the first through fifteenth aspects, the CLI resource is associated with a downlink bandwidth part and wherein the updated CLI resource is associated with at least one of a flexible subband or an uplink subband. In a seventeenth aspect, alone or in combination with one or more of the first through sixteenth aspects, process 900 includes transmitting a CLI measurement resource update indication, wherein the updated CLI resource is based on the CLI measurement resource update indication.

In an eighteenth aspect, alone or in combination with one or more of the first through seventeenth aspects, process 900 includes transmitting an aperiodic CLI trigger signal associated with a CLI measurement task. In a nineteenth aspect, alone or in combination with one or more of the first through eighteenth aspects, a first slot configuration is associated with the configuration information and omits a CLI resource, and wherein a second slot configuration is associated with the dynamic SBFD update indication and includes the updated CLI resource. In a twentieth aspect, alone or in combination with one or more of the first through nineteenth aspects, the CLI measurement task is associated with obtaining a CLI measurement. In a twenty-first aspect, alone or in combination with one or more of the first through twentieth aspects, the CLI measurement task is associated with transmitting a CLI reference signal.

In a twenty-second aspect, alone or in combination with one or more of the first through twenty-first aspects, the SBFD update indication comprises DCI including a first GC DCI and a second GC DCI. In a twenty-third aspect, alone or in combination with one or more of the first through twenty-second aspects, the SBFD resource is associated with at least one of a downlink subband or an uplink subband and wherein the updated CLI resource is associated with at least one downlink bandwidth part. In a twenty-fourth aspect, alone or in combination with one or more of the first through twenty-third aspects, transmitting the aperiodic CLI trigger signal comprises transmitting the aperiodic CLI trigger signal prior to transmitting the dynamic SBFD update indication. In a twenty-fifth aspect, alone or in combination with one or more of the first through twenty-fourth aspects, transmitting the aperiodic CLI trigger signal comprises transmitting the aperiodic CLI trigger signal subsequent to transmitting the dynamic SBFD update indication. In a twenty-sixth aspect, alone or in combination with one or more of the first through twenty-fifth aspects, transmitting the dynamic SBFD update indication comprises transmitting first GC DCI, and wherein transmitting the aperiodic CLI trigger signal comprises transmitting at least one of second GC DCI or a dedicated aperiodic trigger signal. In a twenty-seventh aspect, alone or in combination with one or more of the first through twenty-sixth aspects, the aperiodic CLI trigger signal comprises GC DCI including a first GC DCI format and a second GC DCI format, and wherein transmitting the dynamic SBFD update indication comprises receiving the GC DCI.

In a twenty-eighth aspect, alone or in combination with one or more of the first through twenty-seventh aspects, transmitting the aperiodic CLI trigger signal comprises transmitting at least one of scheduling DCI, non-scheduling DCI, or a MAC CE. In a twenty-ninth aspect, alone or in combination with one or more of the first through twenty-eighth aspects, the aperiodic CLI trigger signal is associated with at least one of a UE or a group of UEs including the UE. In a thirtieth aspect, alone or in combination with one or more of the first through twenty-ninth aspects, process 900 includes receiving a CLI report based on an updated CLI report configuration, wherein the updated CLI report configuration is based on the dynamic SBFD update indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
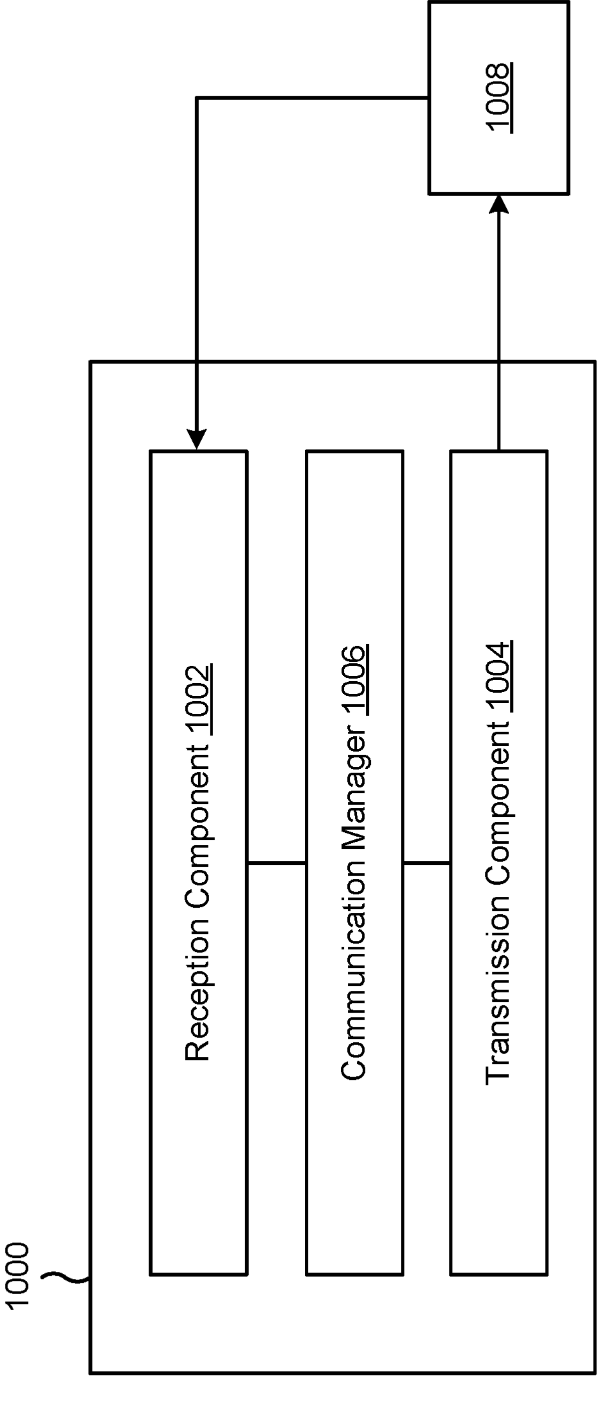
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 7A-7J. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive configuration information indicative of a semi-static time and frequency SBFD configuration associated with at least one resource semi-statically configured as an SBFD resource, wherein the at least one resource comprises a time and frequency resource. The reception component 1002 may receive a dynamic SBFD update indication associated with the at least one resource. The communication manager 1006 may perform a CLI measurement task associated with an updated CLI resource based on the dynamic SBFD update indication.

The reception component 1002 may receive an indication of a CLI resource, wherein the CLI resource comprises a first downlink CLI measurement resource and wherein the updated CLI resource comprises a second downlink CLI measurement resource. The reception component 1002 may receive an indication of a CLI resource, wherein the CLI resource comprises a CLI measurement resource associated with an uplink subband and wherein the updated CLI resource comprises a CLI measurement resource associated with a downlink bandwidth part. The communication manager 1006 may refrain from performing a CLI measurement associated with at least one flexible subband based on the dynamic SBFD update indication. The reception component 1002 may receive an indication of a CLI resource, wherein the CLI resource comprises a flexible CLI measurement resource and wherein the updated CLI resource comprises a downlink measurement resource.

The reception component 1002 may receive an SFI, wherein the updated CLI resource comprises a downlink measurement resource based on receiving the SFI. The reception component 1002 may receive an indication of a CLI resource, wherein the CLI resource comprises a downlink bandwidth part resource and wherein the updated CLI resource comprises a wideband resource associated with at least one downlink subband. The reception component 1002 may receive an indication of a CLI resource, wherein the CLI resource comprises a downlink bandwidth part resource and wherein the updated CLI resource comprises a measurement resource associated with an uplink subband. The reception component 1002 may receive a CLI measurement resource update indication, wherein the updated CLI resource is based on the CLI measurement resource update indication. The reception component 1002 may receive an aperiodic CLI trigger signal, wherein performing the CLI measurement task further comprises performing the CLI measurement task based on the aperiodic CLI trigger signal. The transmission component 1004 may transmit a CLI report based on an updated CLI report configuration, wherein the updated CLI report configuration is based on the dynamic SBFD update indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
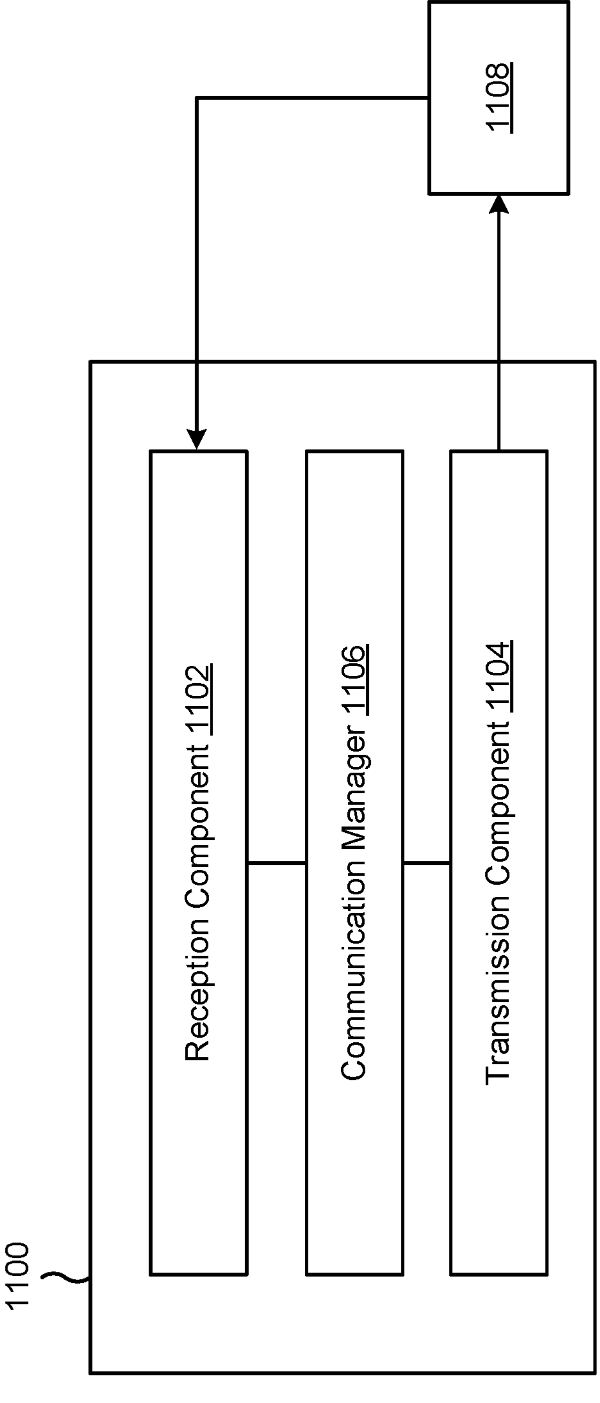
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7A-7J. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit configuration information indicative of a semi-static time and frequency SBFD configuration associated with at least one resource semi-statically configured as an SBFD resource, wherein the at least one resource comprises a time and frequency resource. The transmission component 1104 may transmit a dynamic SBFD update indication associated with the at least one resource. The communication manager 1106 may perform a CLI measurement task associated with an updated CLI resource based on the dynamic SBFD update indication. The transmission component 1104 may transmit an indication of a CLI resource, wherein the CLI resource comprises a first downlink CLI measurement resource and wherein the updated CLI resource comprises a second downlink CLI measurement resource. The transmission component 1104 may transmit an indication of a CLI resource, wherein the CLI resource comprises a CLI measurement resource associated with an uplink subband and wherein the updated CLI resource comprises a CLI measurement resource associated with a downlink bandwidth part.

The transmission component 1104 may transmit an indication of a CLI resource, wherein the CLI resource comprises a flexible CLI measurement resource and wherein the updated CLI resource comprises a downlink measurement resource. The transmission component 1104 may transmit a slot format indicator (SFI), wherein the updated CLI resource comprises a downlink measurement resource based on receiving the SFI. The transmission component 1104 may transmit an indication of a CLI resource, wherein the CLI resource comprises a downlink bandwidth part resource and wherein the updated CLI resource comprises a wideband resource associated with at least one downlink subband. The transmission component 1104 may transmit an indication of a CLI resource, wherein the CLI resource comprises a downlink bandwidth part resource and wherein the updated CLI resource comprises a measurement resource associated with an uplink subband.

The transmission component 1104 may transmit a CLI measurement resource update indication, wherein the updated CLI resource is based on the CLI measurement resource update indication. The transmission component 1104 may transmit an aperiodic CLI trigger signal associated with a CLI measurement task. The reception component 1102 may receive a CLI report based on an updated CLI report configuration, wherein the updated CLI report configuration is based on the dynamic SBFD update indication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving configuration information indicative of a semi-static time and frequency subband full-duplex (SBFD) configuration associated with at least one resource semi-statically configured as an SBFD resource, wherein the at least one resource comprises a time and frequency resource receiving a dynamic SBFD update indication associated with the at least one resource; and performing a cross link interference (CLI) measurement task associated with an updated CLI resource based on the dynamic SBFD update indication.

Aspect 2: The method of Aspect 1, wherein the dynamic SBFD update indication is associated with converting the SBFD resource to a downlink resource.

Aspect 3: The method of Aspect 2, further comprising receiving an indication of a CLI resource, wherein the CLI resource comprises a first downlink CLI measurement resource and wherein the updated CLI resource comprises a second downlink CLI measurement resource.

Aspect 4: The method of Aspect 3, wherein the first downlink CLI measurement resource is associated with at least one downlink subband and wherein the second downlink CLI measurement resource is associated with a downlink bandwidth part.

Aspect 5: The method of any of Aspects 2-4, further comprising receiving an indication of a CLI resource, wherein the CLI resource comprises a CLI measurement resource associated with an uplink subband and wherein the updated CLI resource comprises a CLI measurement resource associated with a downlink bandwidth part.

Aspect 6: The method of any of Aspects 1-3, wherein the at least one resource comprises a flexible resource associated with a semi-statically configured uplink subband, wherein the dynamic SBFD update indication is associated with converting the SBFD resource to an uplink resource, and wherein the updated CLI resource comprises a CLI transmission resource.

Aspect 7: The method of Aspect 6, wherein uplink resource is associated with a whole uplink bandwidth part.

Aspect 8: The method of either of Aspects 6 or 7, wherein CLI transmission resource comprises a CLI sounding reference signal (SRS) resource, the method further comprising transmitting an SRS using the CLI SRS resource based on the dynamic SBFD update indication.

Aspect 9: The method of any of Aspects 6-8, further comprising refraining from performing a CLI measurement associated with at least one flexible subband based on the dynamic SBFD update indication.

Aspect 11: The method of Aspect 10, wherein the downlink resource is associated with a downlink bandwidth part.

Aspect 12: The method of either of Aspects 10 or 11, further comprising receiving an indication of a CLI resource, wherein the CLI resource comprises a flexible CLI measurement resource and wherein the updated CLI resource comprises a downlink measurement resource.

Aspect 13: The method of Aspect 12, wherein the flexible CLI measurement resource is associated with at least one flexible subband and wherein the downlink measurement resource is associated with a downlink bandwidth part.

Aspect 14: The method of any of Aspects 10-13, further comprising receiving a slot format indicator (SFI), wherein the updated CLI resource comprises a downlink measurement resource based on receiving the SFI.

Aspect 15: The method of any of Aspects 1-14, wherein the dynamic SBFD update indication is associated with adding at least one additional SBFD resource to a downlink resource.

Aspect 16: The method of Aspect 15, further comprising receiving an indication of a CLI resource, wherein the CLI resource comprises a whole downlink bandwidth part resource and wherein the updated CLI resource comprises a wideband resource associated with at least one downlink subband.

Aspect 17: The method of either of Aspects 15 or 16, further comprising receiving an indication of a CLI resource, wherein the CLI resource comprises a whole downlink bandwidth part resource and wherein the updated CLI resource comprises a measurement resource associated with an uplink subband.

Aspect 18: The method of any of Aspects 15-17, wherein the CLI resource is associated with a downlink bandwidth part and wherein the updated CLI resource is associated with at least one of a flexible subband or an uplink subband.

Aspect 19: The method of any of Aspects 1-18, further comprising receiving a CLI measurement resource update indication, wherein the updated CLI resource is based on the CLI measurement resource update indication.

Aspect 20: The method of any of Aspects 1-19, further comprising: receiving an aperiodic CLI trigger signal, wherein performing the CLI measurement task further comprises performing the CLI measurement task based on the aperiodic CLI trigger signal.

Aspect 21: The method of Aspect 20, wherein a first slot configuration is associated with the configuration information and omits a CLI resource, and wherein a second slot configuration is associated with the dynamic SBFD update indication and includes the updated CLI resource.

Aspect 22: The method of either of Aspects 20 or 21, wherein performing the CLI measurement task comprises obtaining a CLI measurement.

Aspect 23: The method of any of Aspects 20-22, wherein performing the CLI measurement task comprises transmitting a CLI reference signal.

Aspect 24: The method of any of Aspects 20-23, wherein the SBFD update indication comprises downlink control information (DCI) including a first group common (GC) DCI and a second GC DCI.

Aspect 25: The method of any of Aspects 20-24, wherein the SBFD resource is associated with at least one of a downlink subband or an uplink subband and wherein the updated CLI resource is associated with at least one downlink bandwidth part.

Aspect 26: The method of any of Aspects 20-25, wherein receiving the aperiodic CLI trigger signal comprises receiving the aperiodic CLI trigger signal prior to receiving the dynamic SBFD update indication.

Aspect 27: The method of any of Aspects 20-26, wherein receiving the aperiodic CLI trigger signal comprises receiving the aperiodic CLI trigger signal subsequent to receiving the dynamic SBFD update indication.

Aspect 28: The method of any of Aspects 20-27, wherein receiving the dynamic SBFD update indication comprises receiving first group common (GC) downlink control information (DCI), and wherein receiving the aperiodic CLI trigger signal comprises receiving at least one of second GC DCI or a dedicated aperiodic trigger signal.

Aspect 29: The method of any of Aspects 20-28, wherein the aperiodic CLI trigger signal comprises group common (GC) downlink control information (DCI) including a first GC DCI format and a second GC DCI format, and wherein receiving the dynamic SBFD update indication comprises receiving the GC DCI.

Aspect 30: The method of any of Aspects 20-29, wherein receiving the aperiodic CLI trigger signal comprises receiving at least one of scheduling downlink control information (DCI), non-scheduling DCI, or a medium access control control element (MAC CE).

Aspect 31: The method of any of Aspects 20-30, wherein the aperiodic CLI trigger signal is associated with at least one of the UE or a group of UEs including the UE.

Aspect 32: The method of any of Aspects 1-31, further comprising transmitting a CLI report based on an updated CLI report configuration, wherein the updated CLI report configuration is based on the dynamic SBFD update indication.

Aspect 33: A method of wireless communication performed by a network node, comprising: transmitting configuration information indicative of a semi-static time and frequency subband full-duplex (SBFD) configuration associated with at least one resource semi-statically configured as an SBFD resource, wherein the at least one resource comprises a time and frequency resource; transmitting a dynamic SBFD update indication associated with the at least one resource; and performing a cross link interference (CLI) measurement task associated with an updated CLI resource based on the dynamic SBFD update indication.

Aspect 34: The method of Aspect 33, wherein the dynamic SBFD update indication is associated with converting the SBFD resource to a downlink resource.

Aspect 35: The method of Aspect 34, further comprising transmitting an indication of a CLI resource, wherein the CLI resource comprises a first downlink CLI measurement resource and wherein the updated CLI resource comprises a second downlink CLI measurement resource.

Aspect 36: The method of Aspect 35, wherein the first downlink CLI measurement resource is associated with at least one downlink subband and wherein the second downlink CLI measurement resource is associated with a downlink bandwidth part.

Aspect 37: The method of any of Aspects 34-36, further comprising transmitting an indication of a CLI resource, wherein the CLI resource comprises a CLI measurement resource associated with an uplink subband and wherein the updated CLI resource comprises a CLI measurement resource associated with a downlink bandwidth part.

Aspect 38: The method of any of Aspects 33-37, wherein the at least one resource comprises a flexible resource associated with a semi-statically configured uplink subband, wherein the dynamic SBFD update indication is associated with converting the SBFD resource to an uplink resource, and wherein the updated CLI resource comprises a CLI transmission resource.

Aspect 39: The method of Aspect 38, wherein uplink resource is associated with a whole uplink bandwidth part.

Aspect 40: The method of either of Aspects 38 or 39, wherein CLI transmission resource comprises a CLI sounding reference signal (SRS) resource, the method further comprising receiving an SRS using the CLI SRS resource based on the dynamic SBFD update indication.

Aspect 42: The method of Aspect 41, wherein the downlink resource is associated with a whole downlink bandwidth part.

Aspect 43: The method of either of Aspects 41 or 42, further comprising transmitting an indication of a CLI resource, wherein the CLI resource comprises a flexible CLI measurement resource and wherein the updated CLI resource comprises a downlink measurement resource.

Aspect 44: The method of Aspect 43, wherein the flexible CLI measurement resource is associated with at least one flexible subband and wherein the downlink measurement resource is associated with a downlink bandwidth part.

Aspect 45: The method of any of Aspects 42-44, further comprising transmitting a slot format indicator (SFI), wherein the updated CLI resource comprises a downlink measurement resource based on receiving the SFI.

Aspect 46: The method of any of Aspects 33-45, wherein the dynamic SBFD update indication is associated with adding at least one additional SBFD resource to a downlink resource.

Aspect 47: The method of Aspect 46, further comprising transmitting an indication of a CLI resource, wherein the CLI resource comprises a downlink bandwidth part resource and wherein the updated CLI resource comprises a wideband resource associated with at least one downlink subband.

Aspect 48: The method of either of Aspects 46 or 47, further comprising transmitting an indication of a CLI resource, wherein the CLI resource comprises a downlink bandwidth part resource and wherein the updated CLI resource comprises a measurement resource associated with an uplink subband.

Aspect 49: The method of Aspect 48, wherein the CLI resource is associated with a downlink bandwidth part and wherein the updated CLI resource is associated with at least one of a flexible subband or an uplink subband.

Aspect 50: The method of any of Aspects 33-49, further comprising transmitting a CLI measurement resource update indication, wherein the updated CLI resource is based on the CLI measurement resource update indication.

Aspect 51: The method of any of Aspects 33-50, further comprising transmitting an aperiodic CLI trigger signal associated with a CLI measurement task.

Aspect 52: The method of Aspect 51, wherein a first slot configuration is associated with the configuration information and omits a CLI resource, and wherein a second slot configuration is associated with the dynamic SBFD update indication and includes the updated CLI resource.

Aspect 53: The method of either of Aspects 51 or 52, wherein the CLI measurement task is associated with obtaining a CLI measurement.

Aspect 54: The method of any of Aspects 51-53, wherein the CLI measurement task is associated with transmitting a CLI reference signal.

Aspect 55: The method of any of Aspects 51-54, wherein the SBFD update indication comprises downlink control information (DCI) including a first group common (GC) DCI and a second GC DCI.

Aspect 56: The method of any of Aspects 51-55, wherein the SBFD resource is associated with at least one of a downlink subband or an uplink subband and wherein the updated CLI resource is associated with at least one downlink bandwidth part.

Aspect 57: The method of any of Aspects 51-56, wherein transmitting the aperiodic CLI trigger signal comprises transmitting the aperiodic CLI trigger signal prior to transmitting the dynamic SBFD update indication.

Aspect 58: The method of any of Aspects 51-57, wherein transmitting the aperiodic CLI trigger signal comprises transmitting the aperiodic CLI trigger signal subsequent to transmitting the dynamic SBFD update indication.

Aspect 59: The method of any of Aspects 51-58, wherein transmitting the dynamic SBFD update indication comprises transmitting first group common (GC) downlink control information (DCI), and wherein transmitting the aperiodic CLI trigger signal comprises transmitting at least one of second GC DCI or a dedicated aperiodic trigger signal.

Aspect 60: The method of any of Aspects 51-59, wherein the aperiodic CLI trigger signal comprises group common (GC) downlink control information (DCI) including a first GC DCI format and a second GC DCI format, and wherein transmitting the dynamic SBFD update indication comprises receiving the GC DCI.

Aspect 61: The method of any of Aspects 51-60, wherein transmitting the aperiodic CLI trigger signal comprises transmitting at least one of scheduling downlink control information (DCI), non-scheduling DCI, or a medium access control control element (MAC CE).

Aspect 62: The method of any of Aspects 51-61, wherein the aperiodic CLI trigger signal is associated with at least one of a user equipment (UE) or a group of UEs including the UE.

Aspect 63: The method of any of Aspects 33-62, further comprising receiving a CLI report based on an updated CLI report configuration, wherein the updated CLI report configuration is based on the dynamic SBFD update indication.

Aspect 64: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-32.

Aspect 65: An apparatus for wireless communication at a device, the apparatus comprising one or more memories and one or more processors coupled to the one or more memories, the one or more processors configured to cause the device to perform the method of one or more of Aspects 1-32.

Aspect 66: An apparatus for wireless communication, the apparatus comprising at least one means for performing the method of one or more of Aspects 1-32.

Aspect 67: A non-transitory computer-readable medium storing code for wireless communication, the code comprising instructions executable by one or more processors to perform the method of one or more of Aspects 1-32.

Aspect 68: A non-transitory computer-readable medium storing a set of instructions for wireless communication, the set of instructions comprising one or more instructions that, when executed by one or more processors of a device, cause the device to perform the method of one or more of Aspects 1-32.

Aspect 69: A device for wireless communication, the device comprising a processing system that includes one or more processors and one or more memories coupled with the one or more processors, the processing system configured to cause the device to perform the method of one or more of Aspects 1-32.

Aspect 70: An apparatus for wireless communication at a device, the apparatus comprising one or more memories and one or more processors coupled to the one or more memories, the one or more processors individually or collectively configured to cause the device to perform the method of one or more of Aspects 1-32.

Aspect 71: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 33-63.

Aspect 72: An apparatus for wireless communication at a device, the apparatus comprising one or more memories and one or more processors coupled to the one or more memories, the one or more processors configured to cause the device to perform the method of one or more of Aspects 33-63.

Aspect 73: An apparatus for wireless communication, the apparatus comprising at least one means for performing the method of one or more of Aspects 33-63.

Aspect 74: A non-transitory computer-readable medium storing code for wireless communication, the code comprising instructions executable by one or more processors to perform the method of one or more of Aspects 33-63.

Aspect 75: A non-transitory computer-readable medium storing a set of instructions for wireless communication, the set of instructions comprising one or more instructions that, when executed by one or more processors of a device, cause the device to perform the method of one or more of Aspects 33-63.

Aspect 76: A device for wireless communication, the device comprising a processing system that includes one or more processors and one or more memories coupled with the one or more processors, the processing system configured to cause the device to perform the method of one or more of Aspects 33-63.

Aspect 77: An apparatus for wireless communication at a device, the apparatus comprising one or more memories and one or more processors coupled to the one or more memories, the one or more processors individually or collectively configured to cause the device to perform the method of one or more of Aspects 33-63.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors coupled to the one or more memories, the one or more processors configured to cause the UE to:

receive configuration information indicative of a semi-static time and frequency subband full-duplex (SBFD) configuration associated with at least one resource semi-statically configured as an SBFD resource, wherein the at least one resource comprises a time and frequency resource;

receive a dynamic SBFD update indication associated with the at least one resource; and perform a cross link interference (CLI) measurement task associated with an updated CLI resource based on the dynamic SBFD update indication.

2. The UE of claim 1, wherein the dynamic SBFD update indication indicates a conversion of the SBFD resource to a downlink resource.

3. The UE of claim 2, wherein the one or more processors are further configured to cause the UE to receive an indication of a CLI resource, wherein the CLI resource comprises a first downlink CLI measurement resource and wherein the updated CLI resource comprises a second downlink CLI measurement resource.

4. The UE of claim 3, wherein the first downlink CLI measurement resource is associated with at least one downlink subband and wherein the second downlink CLI measurement resource is associated with a downlink bandwidth part.

5. The UE of claim 2, wherein the one or more processors are further configured to cause the UE to receive an indication of a CLI resource, wherein the CLI resource comprises a CLI measurement resource associated with an uplink subband and wherein the updated CLI resource comprises a CLI measurement resource associated with a downlink bandwidth part.

6. The UE of claim 1, wherein the at least one resource comprises a flexible resource associated with a semi-statically configured uplink subband, wherein the dynamic SBFD update indication indicates a conversion of the SBFD resource to an uplink resource, and wherein the updated CLI resource comprises a CLI transmission resource.

7. The UE of claim 6, wherein the CLI transmission resource comprises a CLI sounding reference signal (SRS) resource, and wherein the one or more processors are configured to cause the UE to transmit an SRS using the CLI SRS resource based on the dynamic SBFD update indication.

8. The UE of claim 1, wherein the at least one resource comprises a flexible resource associated with a semi-statically configured uplink subband, and wherein the dynamic SBFD update indication indicates a conversion of the SBFD resource to a downlink resource.

9. The UE of claim 8, wherein the one or more processors are further configured to cause the UE to receive an indication of a CLI resource, wherein the CLI resource comprises a flexible CLI measurement resource and wherein the updated CLI resource comprises a downlink measurement resource.

10. The UE of claim 9, wherein the flexible CLI measurement resource is associated with at least one flexible subband and wherein the downlink measurement resource is associated with a downlink bandwidth part.

11. The UE of claim 8, wherein the one or more processors are further configured to cause the UE to receive a slot format indicator (SFI), wherein the updated CLI resource comprises a downlink measurement resource based on receiving the SFI.

12. The UE of claim 1, wherein the dynamic SBFD update indication indicates an addition of at least one additional SBFD resource to a downlink resource, and wherein the one or more processors are further configured to cause the UE to receive an indication of a CLI resource, wherein the CLI resource comprises a downlink bandwidth part resource and wherein the updated CLI resource comprises a wideband resource associated with at least one downlink subband.

13. The UE of claim 1, wherein the dynamic SBFD update indication indicates an addition of at least one additional SBFD resource to a downlink resource, and wherein the one or more processors are further configured to receive an indication of a CLI resource, wherein the CLI resource comprises a downlink bandwidth part resource and wherein the updated CLI resource is associated with at least one of a flexible subband or an uplink subband.

14. The UE of claim 1, wherein the one or more processors are further configured to cause the UE to receive a CLI measurement resource update indication, wherein the updated CLI resource is based on the CLI measurement resource update indication.

15. The UE of claim 1, wherein the one or more processors are further configured to cause the UE to receive an aperiodic CLI trigger signal, wherein the one or more processors, to cause the UE to perform the CLI measurement task, are configured to cause the UE to perform the CLI measurement task based on the aperiodic CLI trigger signal.

16. The UE of claim 15, wherein a first slot configuration is associated with the configuration information and omits a CLI resource, and wherein a second slot configuration is associated with the dynamic SBFD update indication and includes the updated CLI resource.

17. The UE of claim 15, wherein the one or more processors, to cause the UE to perform the CLI measurement task, are configured to cause the UE to obtain a CLI measurement or transmit a CLI reference signal.

18. The UE of claim 15, wherein the SBFD update indication comprises downlink control information (DCI) including a first group common (GC) DCI and a second GC DCI.

19. The UE of claim 15, wherein the SBFD resource is associated with at least one of a downlink subband or an uplink subband and wherein the updated CLI resource is associated with at least one downlink bandwidth part.

20. The UE of claim 15, wherein the one or more processors, to cause the UE to receive the aperiodic CLI trigger signal, are configured to cause the UE to receive the aperiodic CLI trigger signal prior to receiving the dynamic SBFD update indication or subsequent to receiving the dynamic SBFD update indication.

21. The UE of claim 15, wherein the one or more processors, to cause the UE to receive the dynamic SBFD update indication, are configured to cause the UE to receive first group common (GC) downlink control information (DCI), and wherein the one or more processors, to cause the UE to receive the aperiodic CLI trigger signal, are configured to cause the UE to receive at least one of second GC DCI or a dedicated aperiodic trigger signal.

22. The UE of claim 15, wherein the aperiodic CLI trigger signal comprises group common (GC) downlink control information (DCI) including a first GC DCI format and a second GC DCI format, and wherein the one or more processors, to cause the UE to receive the dynamic SBFD update indication, are configured to cause the UE to receive the GC DCI.

23. The UE of claim 15, wherein the one or more processors, to cause the UE to receive the aperiodic CLI trigger signal, are configured to cause the UE to receive at least one of scheduling downlink control information (DCI), non-scheduling DCI, or a medium access control control element (MAC CE).

24. The UE of claim 1, wherein the one or more processors are further configured to cause the UE to transmit a CLI report based on an updated CLI report configuration, wherein the updated CLI report configuration is based on the dynamic SBFD update indication.

25. A network node for wireless communication, comprising:

one or more memories; and one or more processors coupled to the one or more memories, the one or more processors configured to cause the network node to:

transmit configuration information indicative of a semi-static time and frequency subband full-duplex (SBFD) configuration associated with at least one resource semi- statically configured as an SBFD resource, wherein the at least one resource comprises a time and frequency resource;

transmit a dynamic SBFD update indication associated with the at least one resource; and perform a cross link interference (CLI) measurement task associated with an updated CLI resource based on the dynamic SBFD update indication.

26. The network node of claim 25, wherein the dynamic SBFD update indication indicates a conversion of the SBFD resource to a downlink resource.

27. A method of wireless communication performed by a user equipment (UE), comprising:

receiving configuration information indicative of a semi-static time and frequency subband full-duplex (SBFD) configuration associated with at least one resource semi-statically configured as an SBFD resource, wherein the at least one resource comprises a time and frequency resource receiving a dynamic SBFD update indication associated with the at least one resource; and performing a cross link interference (CLI) measurement task associated with an updated CLI resource based on the dynamic SBFD update indication.

28. The method of claim 27, wherein the dynamic SBFD update indication is associated with converting the SBFD resource to a downlink resource.

29. A method of wireless communication performed by a network node, comprising:

transmitting configuration information indicative of a semi-static time and frequency subband full-duplex (SBFD) configuration associated with at least one resource semi-statically configured as an SBFD resource, wherein the at least one resource comprises a time and frequency resource;

transmitting a dynamic SBFD update indication associated with the at least one resource; and performing a cross link interference (CLI) measurement task associated with an updated CLI resource based on the dynamic SBFD update indication.

30. The method of claim 29, wherein the dynamic SBFD update indication is associated with converting the SBFD resource to a downlink resource.

* * * * *